US012528266B2

(12) United States Patent
Iwama

(10) Patent No.: US 12,528,266 B2
(45) Date of Patent: Jan. 20, 2026

(54) MEDIUM PROCESSING APPARATUS AND IMAGE FORMING SYSTEM INCORPORATING SAME

(71) Applicant: Dai Iwama, Kanagawa (JP)

(72) Inventor: Dai Iwama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/941,559

(22) Filed: Nov. 8, 2024

(65) Prior Publication Data

US 2025/0178304 A1 Jun. 5, 2025

(30) Foreign Application Priority Data

Nov. 30, 2023 (JP) ................................. 2023-202976

(51) Int. Cl.

*B31F 5/02* (2006.01)
*B31F 5/00* (2006.01)
*B41J 3/44* (2006.01)
*G03G 15/00* (2006.01)

(52) U.S. Cl.

CPC ................... *B31F 5/02* (2013.01); *B41J 3/44* (2013.01); *G03G 15/6544* (2013.01); *B31F 5/001* (2013.01)

(58) Field of Classification Search

CPC .... B31F 5/02; B31F 5/001; B41J 3/44; G03G 15/6544

See application file for complete search history.

(56) References Cited

U.S. PATENT DOCUMENTS

| | | | | |
|---|---|---|---|---|
| 7,984,979 | B2 * | 7/2011 | Umeda | B41J 2/17596 347/85 |
| 2011/0216137 | A1 | 9/2011 | Okano | |
| 2011/0310197 | A1 * | 12/2011 | Yazawa | B41J 2/17509 347/86 |
| 2018/0339484 | A1 * | 11/2018 | Takahashi | B65H 37/04 |
| 2018/0339485 | A1 * | 11/2018 | Takahashi | B42C 1/12 |
| 2023/0242369 | A1 | 8/2023 | Tsuruoka et al. | |

FOREIGN PATENT DOCUMENTS

| | | |
|---|---|---|
| JP | 2011-183648 A | 9/2011 |
| JP | 2019-010810 A | 1/2019 |
| JP | 2023-111836 A | 8/2023 |

* cited by examiner

*Primary Examiner* — David H Banh
(74) *Attorney, Agent, or Firm* — IPUSA, PLLC

(57) ABSTRACT

A medium processing apparatus includes a liquid applier, a crimper, and a mover. The liquid applier applies liquid on a medium. The crimper crimps and binds multiple media including the medium with the liquid applied. The mover moves the liquid applier. The liquid applier includes a liquid storage, a liquid supply member, a liquid application member, and a liquid supply facilitator. The liquid supply member has first and second ends. The liquid application member is attached to the second end of the liquid supply member. The liquid application member contacts the medium to apply the liquid onto the medium. The liquid supply facilitator increases a contact area between the liquid supply member and the liquid in the liquid storage, in response to a movement of the liquid applier. The mover moves the liquid applier between an application position and a separation position.

9 Claims, 29 Drawing Sheets

MEDIUM PROCESSING APPARATUS AND IMAGE FORMING SYSTEM INCORPORATING SAME

CROSS-REFERENCE TO RELATED APPLICATION

This patent application is based on and claims priority pursuant to 35 U.S.C. § 119 (a) to Japanese Patent Application No. 2023-202976, filed on Nov. 30, 2023, in the Japan Patent Office, the entire disclosure of which is hereby incorporated by reference herein.

BACKGROUND

Technical Field

Embodiments of the present disclosure relate to a medium processing apparatus and an image forming system incorporating the medium processing apparatus.

Background Art

Medium processing apparatuses are known in the related art that bind sheet-shaped media, on which images are formed by image forming apparatuses, into a bundle of media. Some media processing apparatuses include a crimper that can perform so-called "crimp binding" without metal binding needles from a viewpoint of resource saving and reduction in environmental load. Specifically, the crimper sandwiches a sheet bundle (multiple media) with serrate binding teeth to press and deform the sheet bundle.

An increased number of media of the crimper hamper the binding teeth in biting into the sheet bundle and may cause some sheets to peel off from the bound sheets. Thus, the crimp binding has some difficulties in keeping the sheet bundle bound as appropriate. To increase the binding strength, some medium processing apparatuses that execute the crimp binding include a liquid application unit that applies liquid according to the number of media to be bound, to a position on a medium where the binding teeth contact the medium, to allow the binding teeth to easily bite into a sheet bundle.

The above-described liquid application unit known in the art applies liquid to a medium by sucking up the liquid stored in a liquid storage into a liquid supply member by capillary action and pressing a liquid application member attached to an end of the liquid supply member against the medium. Due to such a configuration, when the liquid is repeatedly applied to the medium, the supply of liquid to the liquid application member may not catch up with the liquid application, and the amount of the liquid applied to the medium may become unstable.

SUMMARY

Embodiments of the present disclosure described herein provide a novel medium processing apparatus including a liquid applier, a crimper, and a mover. The liquid applier applies liquid on a medium. The crimper crimps and binds multiple media including the medium with the liquid applied by the liquid applier. The mover moves the liquid applier. The liquid applier includes a liquid storage, a liquid supply member, a liquid application member, and a liquid supply facilitator. The liquid storage stores liquid. The liquid supply member has a first end immersed in the liquid stored in the liquid storage, and a second end opposite to the first end. The liquid application member is attached to the second end of the liquid supply member. The liquid application member contacts the medium to apply the liquid onto the medium. The liquid supply facilitator increases a contact area between the liquid supply member and the liquid stored in the liquid storage, in response to a movement of the liquid applier from an application position to a separation position. The mover moves the liquid applier between the application position at which the liquid application member contacts the medium to apply the liquid to the medium and the separation position at which the liquid application member is separated from the medium.

Further, embodiments of the present disclosure described herein provide an image forming system including an image forming apparatus to form an image on each medium of multiple media, and the above-described medium processing apparatus to crimp and bind the multiple media having the image on each medium.

BRIEF DESCRIPTION OF THE SEVERAL VIEWS OF THE DRAWINGS

Exemplary embodiments of this disclosure will be described in detail based on the following figures, wherein.

Figure 1:
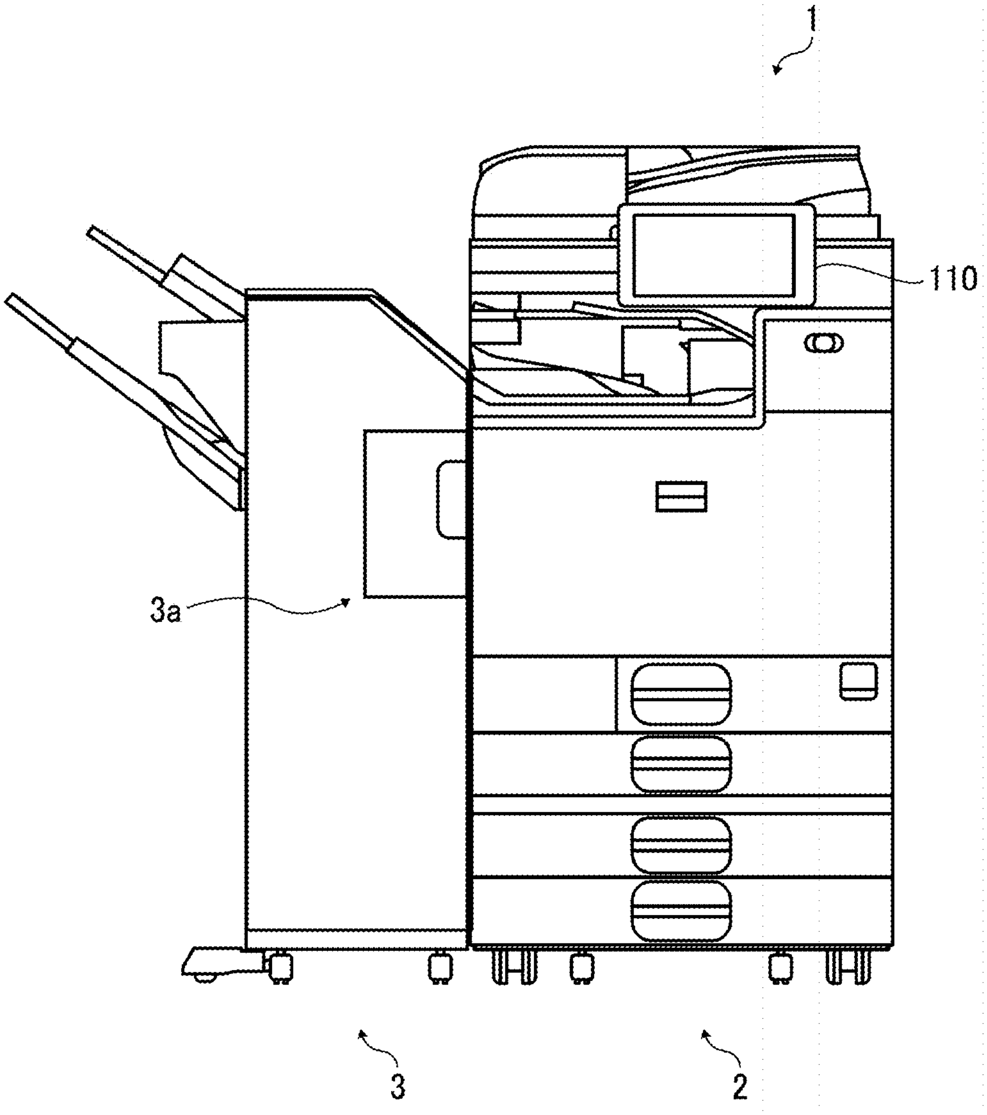
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below in detail with reference to the drawings. Identical reference numerals are assigned to identical or equivalent components and a description of those components may be simplified or omitted.

A description is given below of an image forming system 1 according to an embodiment of the present disclosure, with reference to the drawings.

FIG. 1 is a diagram illustrating an overall configuration of the image forming system 1.

The image forming system 1 has a function of forming an image on a sheet P as a sheet medium and a function of performing a post-processing operation on the sheet P as a process after the image is formed on the sheet P. As illustrated in FIG. 1, the image forming system 1 includes an image forming apparatus 2 and a post-processing apparatus 3 serving as a medium processing apparatus according to an embodiment of the present disclosure. In the image forming system 1, the image forming apparatus 2 and the post-processing apparatus 3 operate along with each other.

The image forming apparatus 2 forms an image on the sheet P and outputs the sheet P bearing the image to the post-processing apparatus 3. The image forming apparatus 2 includes a sheet tray that accommodates the sheet P, a conveyor that conveys the sheet P accommodated in the sheet tray, and an image forming device that forms an image on the sheet P conveyed by the conveyor. The image forming device may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted.

Figure 2:
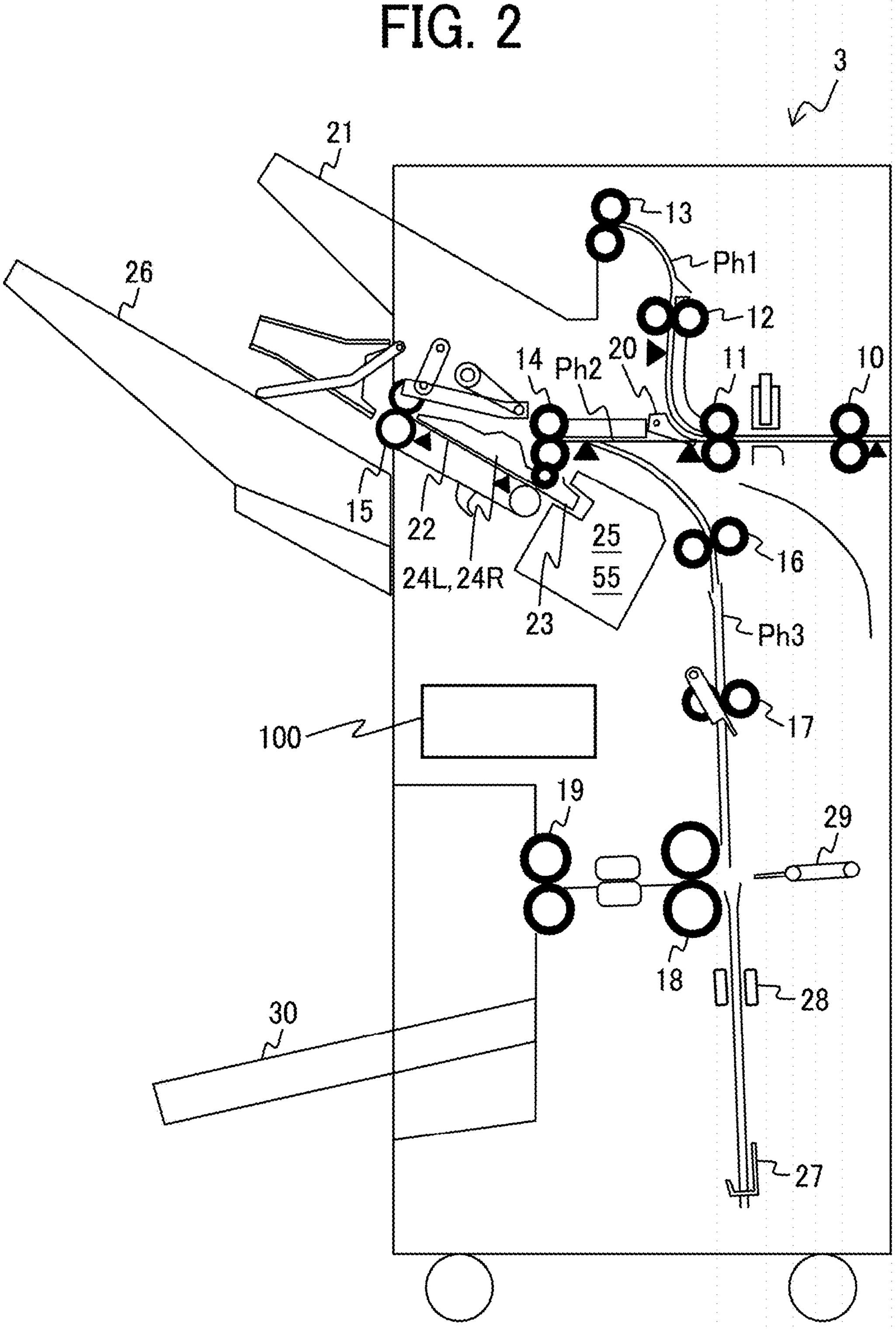
FIG. 2 is a diagram illustrating an internal configuration of a post-processing apparatus included in the image forming system of FIG. 1.

FIG. 2 is a diagram illustrating an internal configuration of the post-processing apparatus 3 included in the image forming system 1 of FIG. 1.

The post-processing apparatus 3 has a function that performs given post-processing on the sheet P on which an image is formed by the image forming apparatus 2. The post-processing according to the present embodiment is a binding process including a stapling process to bind a bundle of multiple sheets P on each sheet of which an image is formed, and a crimp binding process to bind, without staples, the bundle of multiple sheets P. In the following description, the bundle of sheets may be referred to as a "sheet bundle Pb" as a bundle of media.

More specifically, the "crimp binding process" according to the present embodiment is a process called "crimp binding" of applying pressure to a binding position corresponding to a part of sheets P of a sheet bundle Pb to deform (press and deform) the binding position to bind the sheet bundle Pb. Examples of the binding process that can be executed by the post-processing apparatus 3 include edge binding and saddle binding. The edge binding is a process to bind an edge of the sheet bundle Pb. The saddle binding is a process to bind the center of the sheet bundle Pb.

The post-processing apparatus 3 includes conveyance roller pairs 10 to 19 serving as conveyors and a switching member 20. The conveyance roller pairs 10 to 19 convey, inside the post-processing apparatus 3, the sheet P supplied from the image forming apparatus 2. More specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an ejection tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an ejection tray 26 via an internal tray 22. The third conveyance passage Ph3 is a passage branching from the first conveyance passage Ph1 between the conveyance roller pairs 11 and 14 in the conveyance direction and extending to an ejection tray 30.

The switching member 20 serving as a switcher is disposed at a branching position of the first conveyance passage Ph1 and the second conveyance passage Ph2.

Each of the switching member 20 can change the position between a first position and a second position. The switching member 20 at the first position guides the sheet P to be ejected to the ejection tray 21 through the first conveyance passage Ph1. The switching members 20 at the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in reverse to guide the sheet P to the third conveyance passage Ph3. The post-processing apparatus 3 further includes multiple sensors that detects the positions of the sheet P in the first conveyance passage Ph1, the second conveyance passage Ph2, and the third conveyance passage Ph3. Each of the multiple sensors is indicated by a black triangle in FIG. 2.

The post-processing apparatus 3 includes the ejection tray 21. The sheet P that is ejected through the first conveyance passage Ph1 rests on the ejection tray 21. Among the sheets P supplied from the image forming apparatus 2, a sheet P not subjected to the binding process is ejected to the ejection tray 21.

The post-processing apparatus 3 further includes the internal tray 22 serving as a placement tray, an end fence 23, side fences 24L and 24R, an edge binder 25, a staple binder 55 serving as a stapler, and the ejection tray 26. The internal tray 22, the end fence 23, the side fences 24L and 24R, the edge binder 25, and the staple binder 55 perform the edge binding on the sheet bundle Pb of multiple sheets P conveyed to the internal tray 22 from the second conveyance passage Ph2.

Among the sheets P supplied from the image forming apparatus 2, the sheet bundle Pb subjected to the edge binding is ejected to the ejection tray 26.

In the following description, the direction in which the sheet P is conveyed from the conveyance roller pair 15 toward the end fence 23 is defined as a "conveyance direction" of the sheet P. In other words, the "conveyance direction" herein corresponds to a direction in which the sheet P that has been output from the image forming apparatus 2 is moved toward the ejection tray 26 by, for example, the conveyance roller pair 10 and then is moved toward the end fence 23 by the conveyance roller pair 15. The direction that is orthogonal to the conveyance direction and a thickness direction of the sheet P is defined as a "main scanning direction" or a "width direction of the sheet P."

The sheets P that are sequentially conveyed through the second conveyance passage Ph2 are temporarily placed on the internal tray 22 serving as a receptacle. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 and the staple binder 55 bind an end of the sheet bundle Pb aligned by the end fence 23 and the side fences 24L and 24R. Then, the conveyance roller pair 15 ejects the sheet bundle Pb subjected to the edge binding to the ejection tray 26.

A detailed description is given of the edge binder 25 according to an embodiment of the present disclosure.

Figure 3:
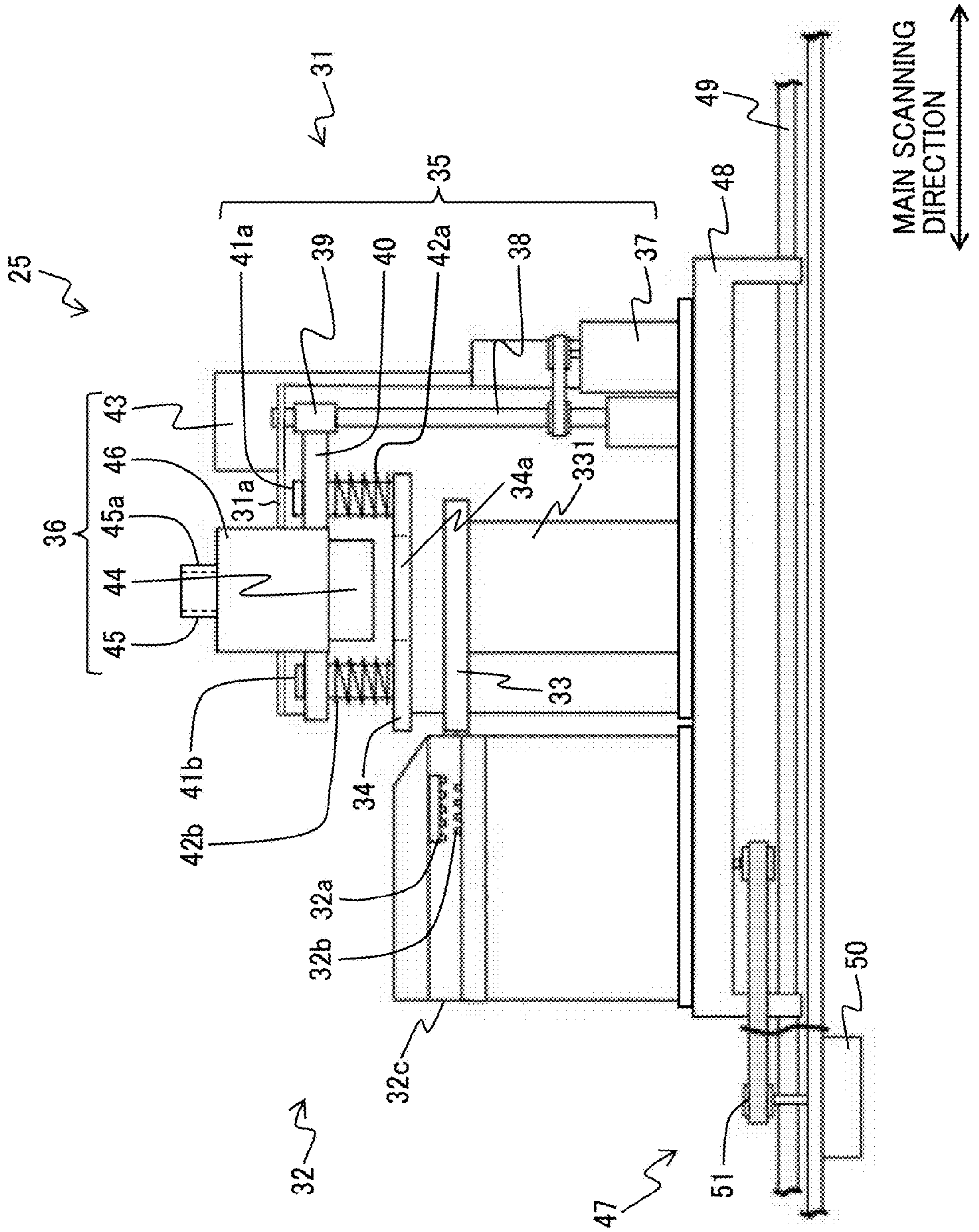
FIG. 3 is a schematic view of an edge binder according to an embodiment of the present disclosure, viewed from an upstream side in a conveyance direction.

FIG. 3 is a schematic view of an upstream side of the edge binder 25 in the conveyance direction.

Figure 4:
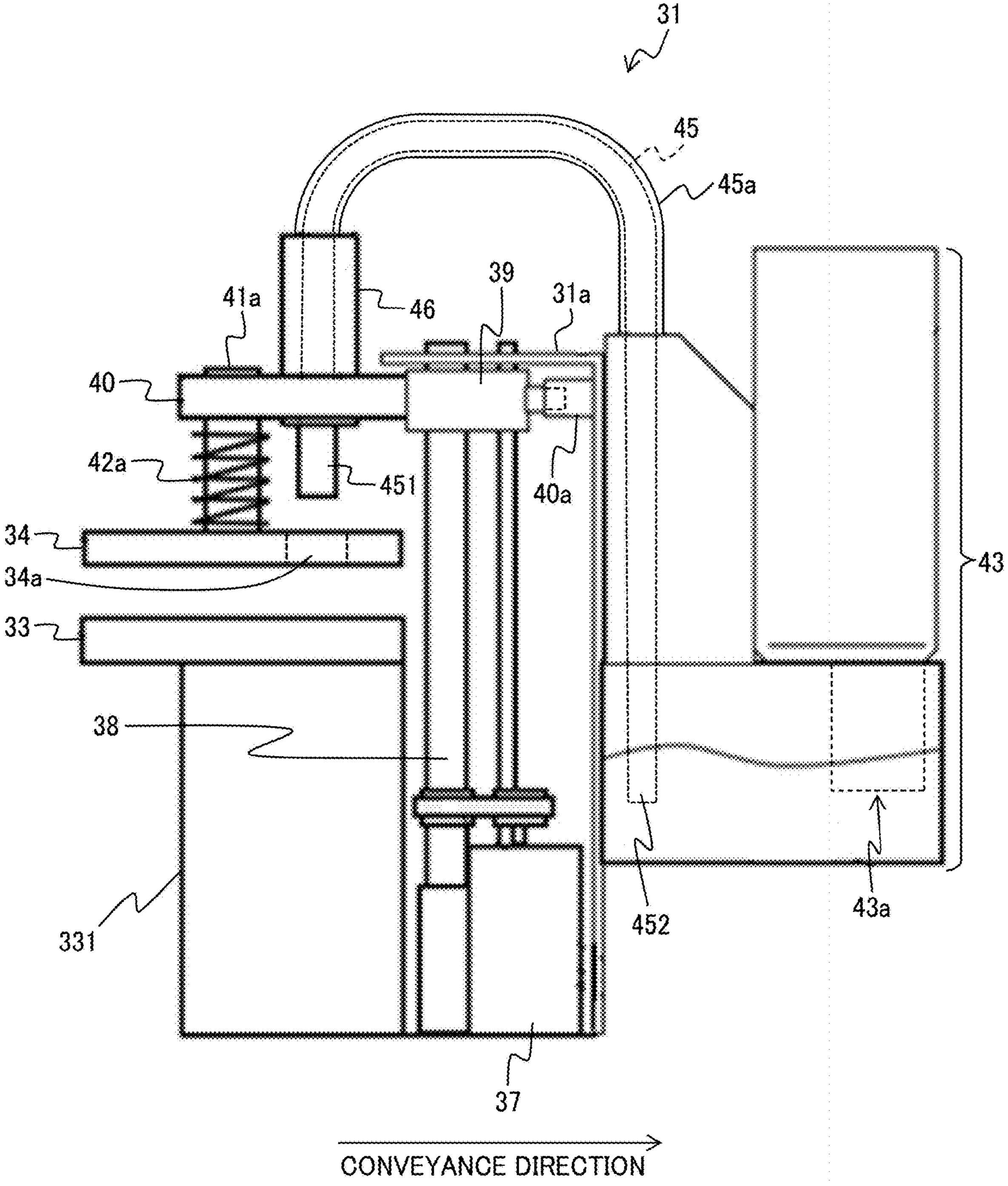
FIG. 4 is a schematic view of the edge binder of FIG. 3 as viewed from the side on which a liquid applier is disposed in a main scanning direction.

FIG. 4 is a schematic diagram illustrating a liquid applier 31 of the edge binder 25 when viewed from the main scanning direction.

As illustrated in FIG. 3, the edge binder 25 includes the liquid applier 31, and a crimper 32 that is an example of a post-processing device and serves as a crimp binder. The liquid applier 31 and the crimper 32 are disposed downstream from the internal tray 22 in the conveyance direction and adjacent to each other in the main scanning direction.

The liquid applier 31 applies liquid (for example, water) stored in a first liquid storage tank 43 as a first liquid storage unit to the sheet P or the sheet bundle Pb placed on the internal tray 22. In the following description, the application of liquid to the sheet P or the sheet bundle Pb may be referred to as "liquid application" whereas a process to apply liquid may be referred to as a "liquid application process."

More specifically, the liquid that is stored in the first liquid storage tank 43 for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in the first liquid storage tank 43 may include an additive in addition to the main component. The liquid that is stored in the first liquid storage tank 43 may include residual chlorine used as tap water. Preferably, for example, the liquid that is stored in the first liquid storage tank 43 may include, as an additive, a colorant, a penetrant, a pH adjuster, a preservative such as phenoxyethanol, a drying inhibitor such as glycerin, or a combination thereof.

Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above can enhance the binding strength of the sheet bundle Pb, in comparison with a liquid of which the main component is not water (liquid).

As illustrated in FIGS. 3 and 4, the liquid applier 31 is movable in the main scanning direction together with the crimper 32 by a driving force transmitted from a first binder movement motor 50. The liquid applier 31 includes a lower pressure plate 33 serving as a placement table for the sheet P or the sheet bundle Pb, an upper pressure plate 34, a liquid applier movement assembly 35, and a liquid application assembly 36. The components of the liquid applier 31 such as the lower pressure plate 33, the upper pressure plate 34, the liquid applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower pressure plate holder 331. The upper pressure plate 34 can move (up and down) in the thickness direction of the sheet P above the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." Further, the upper pressure plate 34 has a through hole 34*a* penetrating in the thickness direction at a position facing the liquid application member 451 (one end portion of a liquid supply member 45 (liquid absorber) to be described later, which corresponds to a tip portion) attached to a base plate 40.

The liquid applier movement assembly 35 moves the upper pressure plate 34, the base plate 40, and the liquid application member 451 in the thickness direction of the sheet P or the sheet bundle Pb. The liquid applier movement assembly 35 according to the present embodiment moves the upper pressure plate 34, the base plate 40, and the liquid application member 451 along with each other with a single liquid applier movement motor 37. The liquid applier movement assembly 35 includes, for example, a liquid applier movement motor 37, a trapezoidal screw 38, a nut 39, the base plate 40, columns 41*a* and 41*b*, and coil springs 42*a* and 42*b*.

The liquid applier movement motor 37 generates driving force to move the upper pressure plate 34, the base plate 40, and the liquid application member 451. The trapezoidal screw 38 extends in a vertical direction in FIGS. 3 and 4 and is rotatably attached to the liquid application frame 31*a*. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

The base plate 40 is disposed above the upper pressure plate 34. The base plate 40 holds the liquid application member 451 with the end of the liquid application member 451 projecting downward. The base plate 40 is coupled to the trapezoidal screw 38 to move together with the trapezoidal screw 38. The position of the base plate 40 in the vertical direction is detected by a position detection sensor 40*a* (see FIG. 8).

The columns 41*a* and 41*b* project downward from the base plate 40 around the end of the liquid application member 451. The columns 41*a* and 41*b* can relatively move with respect to the base plate 40 in the thickness direction. The columns 41*a* and 41*b* have respective lower ends holding the upper pressure plate 34. The columns 41*a* and 41*b* have respective upper ends provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid application assembly 36 applies liquid to the sheet P or the sheet bundle Pb placed on the internal tray 22. Specifically, the liquid application assembly 36 brings the liquid application member 451 into contact with the sheet P or the sheet bundle Pb to apply the liquid to at least one sheet P of the sheet bundle Pb. The liquid application assembly 36 includes the first liquid storage tank 43, the liquid supply member 45 including the liquid application member 451, and the joint 46.

The first liquid storage tank 43 stores the liquid to be supplied to the sheet P or the sheet bundle Pb. The surface of the liquid stored in the first liquid storage tank 43 is detected by a first liquid level sensor 43*a* serving as a first liquid detector.

The liquid supply member 45 serving as a liquid absorber has one end portion as the liquid application member 451 and the other end portion as a liquid immersion portion 452. The liquid immersion portion 452 is immersed in the liquid stored in the first liquid storage tank 43 and draws up the liquid to supply the liquid to the liquid application member 451. The liquid application member 451 is made of a material (e.g., sponge or fiber) having a high liquid absorption rate, such as an elastic resin formed of open cells.

The liquid supply member 45 is made of a material having a high liquid absorption rate, for example, similarly to the liquid application member 451. As a result, the liquid absorbed from the liquid immersion portion 452 of the liquid supply member 45 is supplied to the liquid application member 451 by the capillary action. In other words, the liquid immersion portion 452 has a configuration of drawing up the liquid stored in the first liquid storage tank 43 and supplying the liquid to the liquid application member 451, which is connected to the tip end of the liquid immersion portion 452 through the liquid supply member 45.

The liquid drawn up from the liquid immersion portion 452 is supplied to the liquid application member 451 through the liquid supply member 45, and the liquid application member 451 comes into contact with the uppermost surface of the sheets P or the sheet bundle Pb to apply the liquid. For this reason, the liquid application member 451 is supported by the base plate 40 with the tip end of the liquid application member 451 facing downward.

The liquid supply member 45 may be a unified body made of a material having a high liquid absorption rate. In other words, the liquid application member 451 may be part of the liquid supply member 45. In such a case, liquid can be supplied from the liquid supply member 45 to the liquid application member 451 more smoothly by the capillary action.

A protector 45*a* is an elongated cylindrical body (e.g., a tube) that is fitted around the liquid supply member 45. Accordingly, the protector 45*a* prevents the liquid absorbed by the liquid supply member 45 from leaking or evaporating. Each of the liquid supply member 45 and the protector 45*a* is made of a flexible material. The joint 46 fixes the liquid application member 451 to the base plate 40. Accordingly, the liquid application member 451 keeps projecting downward from the base plate 40 with the end of the liquid application member 451 facing downward, even when the liquid application member 451 is moved by the liquid applier movement assembly 35.

The crimper 32 presses and deforms the sheet bundle Pb with serrate binding teeth 32*a* and 32*b* to bind the sheet bundle Pb. In other words, the crimper 32 can bind the sheet bundle Pb without staples. The components of the crimper 32 such as the upper binding teeth 32*a* serving as upper crimping teeth and the lower binding teeth 32*b* serving as lower crimping teeth are disposed on a crimping frame 32*c*. In the following description, such pressure deformation on a given position on the sheet bundle Pb to bind the sheet bundle Pb may be referred to as "crimping." In other words, the crimper 32 crimps the sheet bundle Pb or performs crimping on the sheet bundle Pb.

A description is given below of the configuration of the upper binding teeth 32*a* and the lower binding teeth 32*b*.

Figure 5A:
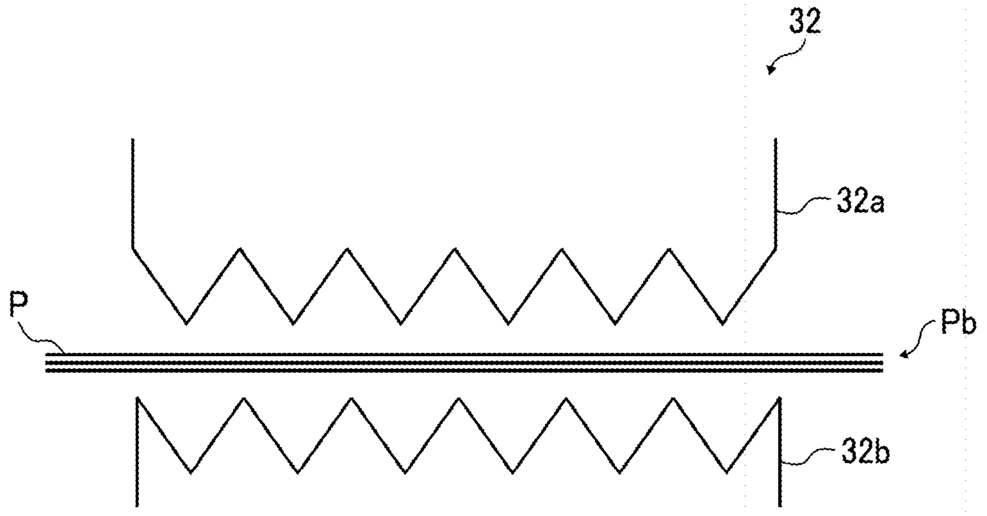
FIGS. 5A and 5B are schematic diagrams illustrating a configuration of a crimper according to an embodiment of the present disclosure.
Figure 5B:

FIGS. 5A and 5B are schematic diagrams illustrating the configuration of the crimper 32.

As illustrated in FIGS. 5A and 5B, the crimper 32 includes the pair of binding teeth 32*a* and 32*b*. The upper binding teeth 32*a* and the lower binding teeth 32*b* are disposed to face each other in the thickness direction of the sheet bundle Pb so that the upper binding teeth 32*a* and the lower binding teeth 32*b* can sandwich the sheet bundle Pb placed on the internal tray 22. The upper binding teeth 32*a* and the lower binding teeth 32*b* have respective serrate faces facing each other. The serrate face of each of the upper binding teeth 32*a* and the lower binding teeth 32*b* includes concave portions and convex portions alternately formed. The concave portions and the convex portions of the upper binding teeth 32*a* are shifted from those of the lower binding teeth 32*b* such that the upper binding teeth 32*a* are engaged with the lower binding teeth 32*b*. The upper binding teeth 32*a* and the lower binding teeth 32*b* are brought into contact with and separated from each other by a driving force of a contact-separation motor 32*d* illustrated in FIG. 8.

In a process in which the sheets P of the sheet bundle Pb are supplied to the internal tray 22, the upper binding teeth 32*a* and the lower binding teeth 32*b* are apart from each other as illustrated in FIG. 5A. When all the sheets P of the sheet bundle Pb are placed on the internal tray 22, the upper binding teeth 32*a* and the lower binding teeth 32*b* are engaged with each other as illustrated in FIG. 5B by the driving force of the contact-separation motor 32*d* to press and deform the sheet bundle Pb in the thickness direction. As a result, the sheet bundle Pb that has been placed on the internal tray 22 is crimped and bound. The sheet bundle Pb thus crimped is ejected to the ejection tray 26 by the conveyance roller pair 15.

The configuration of the crimper 32 as a crimping assembly is not limited to the configuration of the present embodiment provided that the upper binding teeth 32*a* and the lower binding teeth 32*b* of the crimping assembly are engaged with each other. For example, the crimping assembly may bring the upper binding teeth 32*a* and the lower binding teeth 32*b* into contact with each other and separate the upper binding teeth 32*a* and the lower binding teeth 32*b* from each other with a link mechanism and a drive source that simply rotates forward or that rotates forward and backward (for example, the crimping assembly disclosed in Japanese Patent No. 6057167), or may bring the upper binding teeth 32*a* and the lower binding teeth 32*b* into contact with each other and separate the upper binding teeth 32*a* and the lower binding teeth 32*b* from each other linearly with a screw mechanism that converts rotational motion of the drive source in the forward and reverse directions into linear reciprocating motion.

As illustrated in FIG. 3, the edge binder 25 includes a first movement assembly 47. The first movement assembly 47 moves the edge binder 25 (i.e., the liquid applier 31 and the crimper 32) in the main scanning direction along the downstream end of the sheet P, which is placed on the internal tray 22, in the conveyance direction. The first movement assembly 47 includes, for example, the base 48, a guide shaft 49, the first binder movement motor 50, and a driving force transmission assembly 51.

The liquid applier 31 and the crimper 32 are attached to the base 48 with the liquid applier 31 and the crimper 32 being adjacent to each other in the main scanning direction. The guide shaft 49 extends in the main scanning direction at a position downstream from the internal tray 22 in the conveyance direction. The guide shaft 49 supports the base 48 such that the base 48 can move in the main scanning direction. The first binder movement motor 50 generates a driving force for moving the edge binder 25.

The driving force transmission assembly 51 transmits the driving force of the first binder movement motor 50 to the base 48 via a pulley and a timing belt. As a result, the liquid applier 31 and the crimper 32 integrated by the base 48 move in the main scanning direction along the guide shaft 49. The position of the edge binder 25 may be ascertained with, for example, an encoder sensor attached to an output shaft of the first binder movement motor 50.

A description is given of the staple binder 55.

Details of the staple binder 55 having the function of executing the stapling process are described below.

Figure 6:
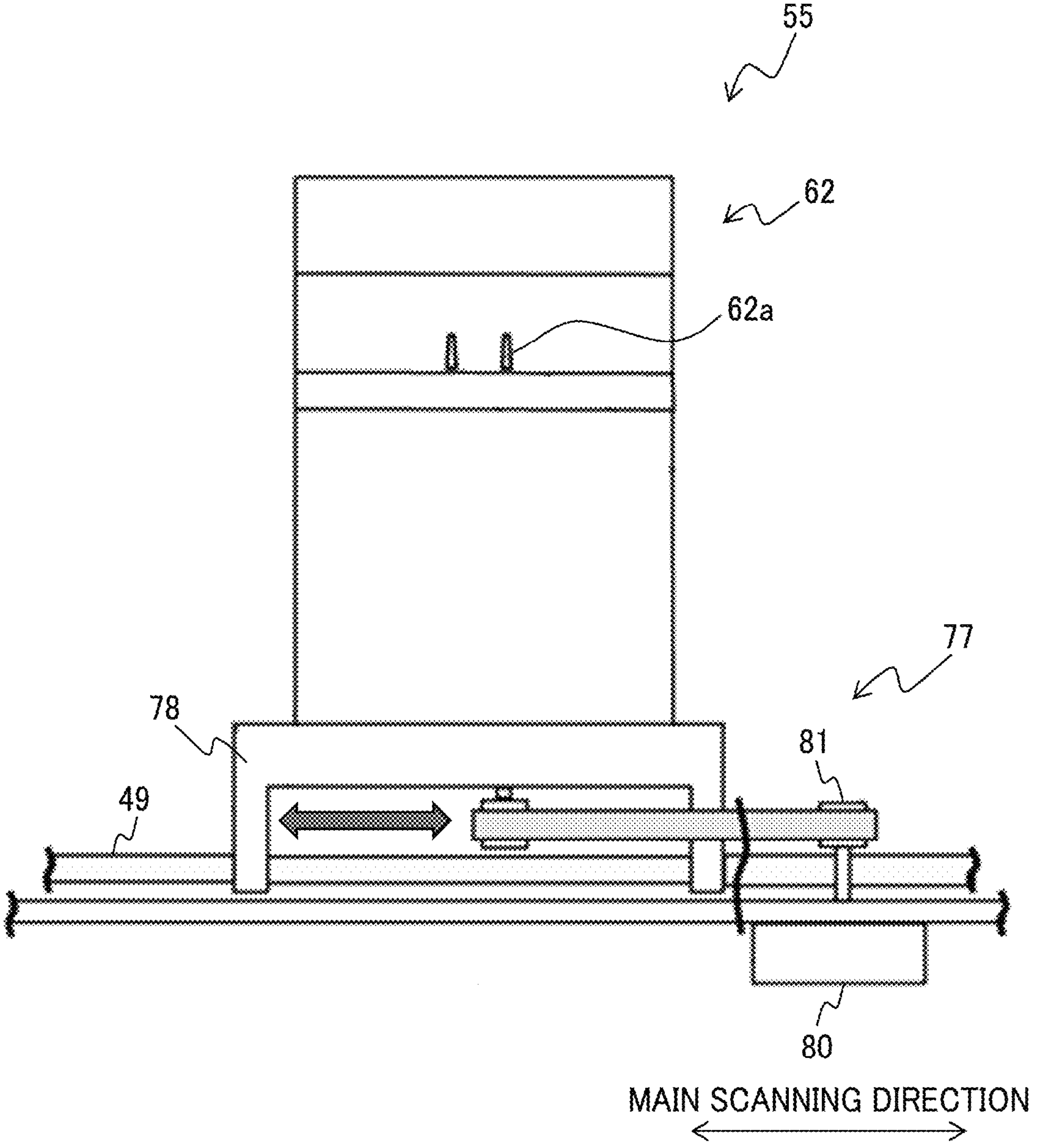
FIG. 6 is a schematic view of a staple binder according to an embodiment of the present disclosure, viewed from an upstream side in a conveyance direction.

FIG. 6 is a schematic diagram illustrating the staple binder 55 as viewed from the upstream side in the conveyance direction.

The staple binder 55 includes a stapler 62 that binds a sheet bundle Pb with staples. The stapler 62 is disposed downstream from the internal tray 22 in the conveyance direction and spaced apart from the edge binder 25 in the main scanning direction.

The stapler 62 has a configuration for performing so-called "stapling" (i.e., stapling process) to bind the sheet bundle Pb with a staple or staples. To be more specific, the stapler 62 includes a stapling-part drive motor 62*d* illustrated in FIG. 8. The stapling-part drive motor 62*d* drives a stapling part 62*a*. The driving force of the stapling-part drive motor 62*d* causes a staple loaded in the stapling part 62*a* to penetrate through a sheet bundle Pb, so that the stapling part 62*a* binds the sheet bundle Pb. Since the stapler 62 has a typical configuration, a detailed description thereof will be omitted unless otherwise required.

As illustrated in FIG. 6, the staple binder 55 includes a second movement assembly 77. The second movement assembly 77 moves the staple binder 55 in the main scanning direction along a downstream end of the sheet P or the sheet bundle Pb placed on the internal tray 22 in the conveyance direction of the sheet P or the sheet bundle Pb. The second movement assembly 77 includes, for example, a base 78, a guide shaft 49, a second binder movement motor 80, and a driving force transmission assembly 81. Since the configuration of the second movement assembly 77 is common to that of the first movement assembly 47, the description thereof is omitted.

The edge binder 25 and the staple binder 55 are supported by the common guide shaft 49. In other words, the first movement assembly 47 and the second movement assembly 77 move the edge binder 25 and the staple binder 55 in the main scanning direction along the common guide shaft 49. The first movement assembly 47 and the second movement assembly 77 can move the edge binder 25 and the staple binder 55 independently of each other.

Figure 7:
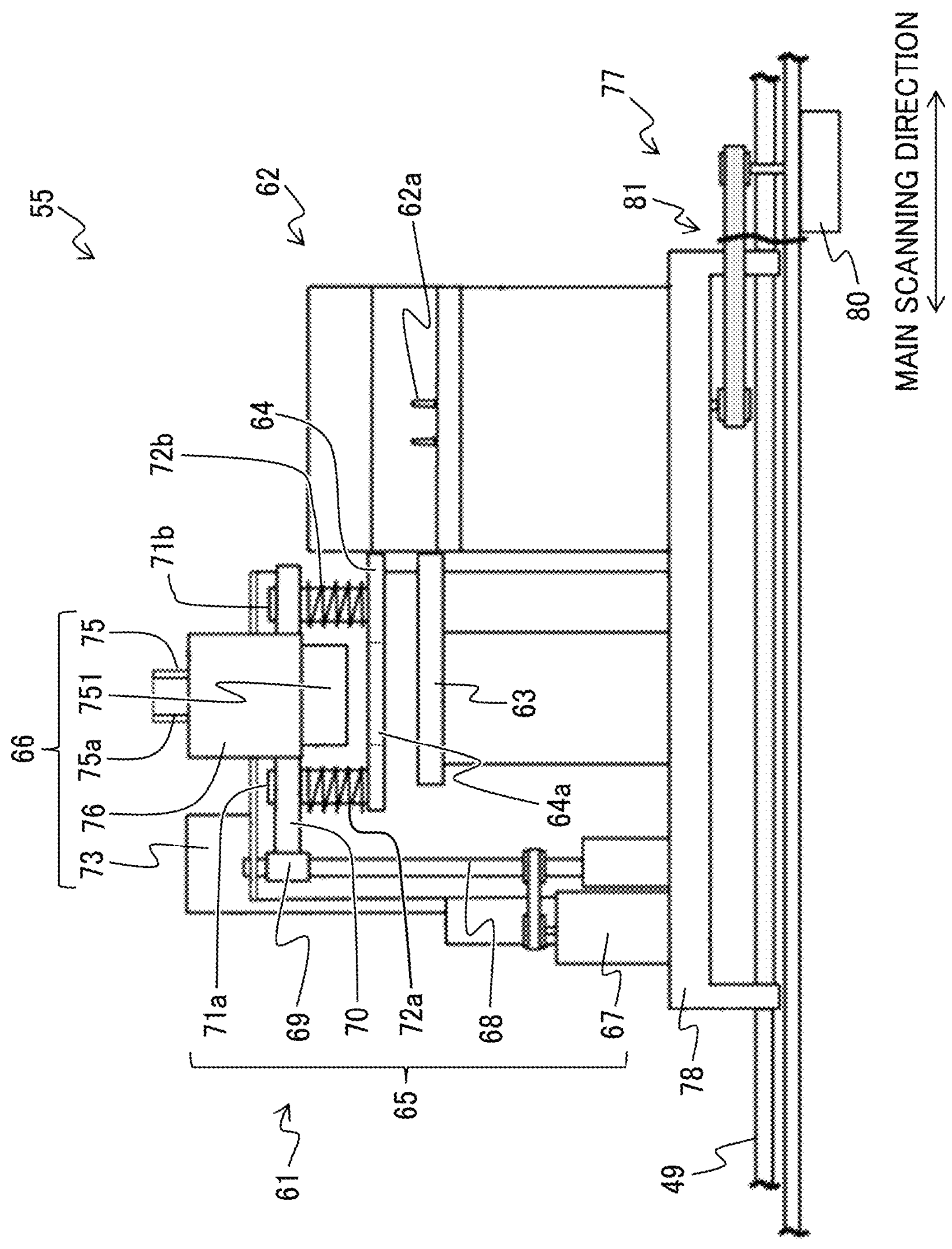
FIG. 7 is a schematic view of a staple binder as a modification of the staple binder of FIG. 6, viewed from the upstream side in the conveyance direction.

FIG. 7 illustrates a staple binder 55' as a modification of the staple binder 55.

More specifically, FIG. 7 is a schematic view of the staple binder 55' as viewed from the upstream side in the conveyance direction.

The staple binder 55' is different from the stapling unit 155 in that the stapling unit 155' includes a second liquid applier 61 in addition to the stapler 62. As illustrated in FIG. 7, the staple binder 55' includes the second liquid applier 61 and the stapler 62. The second liquid applier 61 and the stapler 62 are disposed downstream from the internal tray 22 in the conveyance direction and adjacent to each other in the main scanning direction.

The second liquid applier 61 executes "liquid application" of applying liquid (e.g., water) stored in a third liquid storage tank 73 to the sheet P or the sheet bundle Pb supported on the internal tray 22. A given area including a position to which the liquid is applied on the sheet P or the sheet bundle Pb by the second liquid applier 61 corresponds to a binding position to be stapled. As illustrated in FIG. 7, the second liquid applier 61 includes a second lower pressure plate 63, a second upper pressure plate 64, a second liquid applier movement assembly 65, and a second liquid application assembly 66. The second liquid applier movement assembly 65 includes, for example, a second liquid applier movement motor 67, a second trapezoidal screw 68, a second nut 69, a second base plate 70, second columns 71*a* and 71*b*, and second coil springs 72*a* and 72*b*. The second liquid application assembly 66 includes the third liquid storage tank 73, a second liquid supply member 75, a second liquid application member 751, and a second joint 76. Since the second liquid application assembly 66 and the liquid application assembly 36 have common configurations, redundant descriptions thereof are omitted below unless otherwise required.

In the stapling process, the staple binder 55 performs the liquid application process on the sheet P to loosen and soften the binding position, allowing the staple to easily pass through the sheet bundle Pb. As a result, the number of sheets to be bound per sheet bundle Pb can be increased as compared with a case where the stapling process is performed without applying the liquid.

Referring back to FIG. 2, the post-processing apparatus 3 further includes an end fence 27, a saddle binder 28, a sheet folding blade 29, and the ejection tray 30.

The end fence 27, the saddle binder 28, and the sheet folding blade 29 perform saddle binding on a sheet bundle Pb foamed of the sheets P that are conveyed through the third conveyance passage Ph3. Among the sheets P supplied from the image forming apparatus 2, the sheet bundle Pb subjected to the saddle binding is ejected to the ejection tray 30.

The end fence 27 aligns the positions of the sheets P that are sequentially conveyed through the third conveyance passage Ph3, in a direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to nip the sheet bundle Pb. The conveyance roller pairs 18 and 19 eject the sheet bundle Pb subjected to the saddle binding to the ejection tray 30.

A description is given of a control block of the post-processing apparatus 3.

A description is given below of a control block of the post-processing apparatus 3, with reference to FIG. 8.

Figure 8:
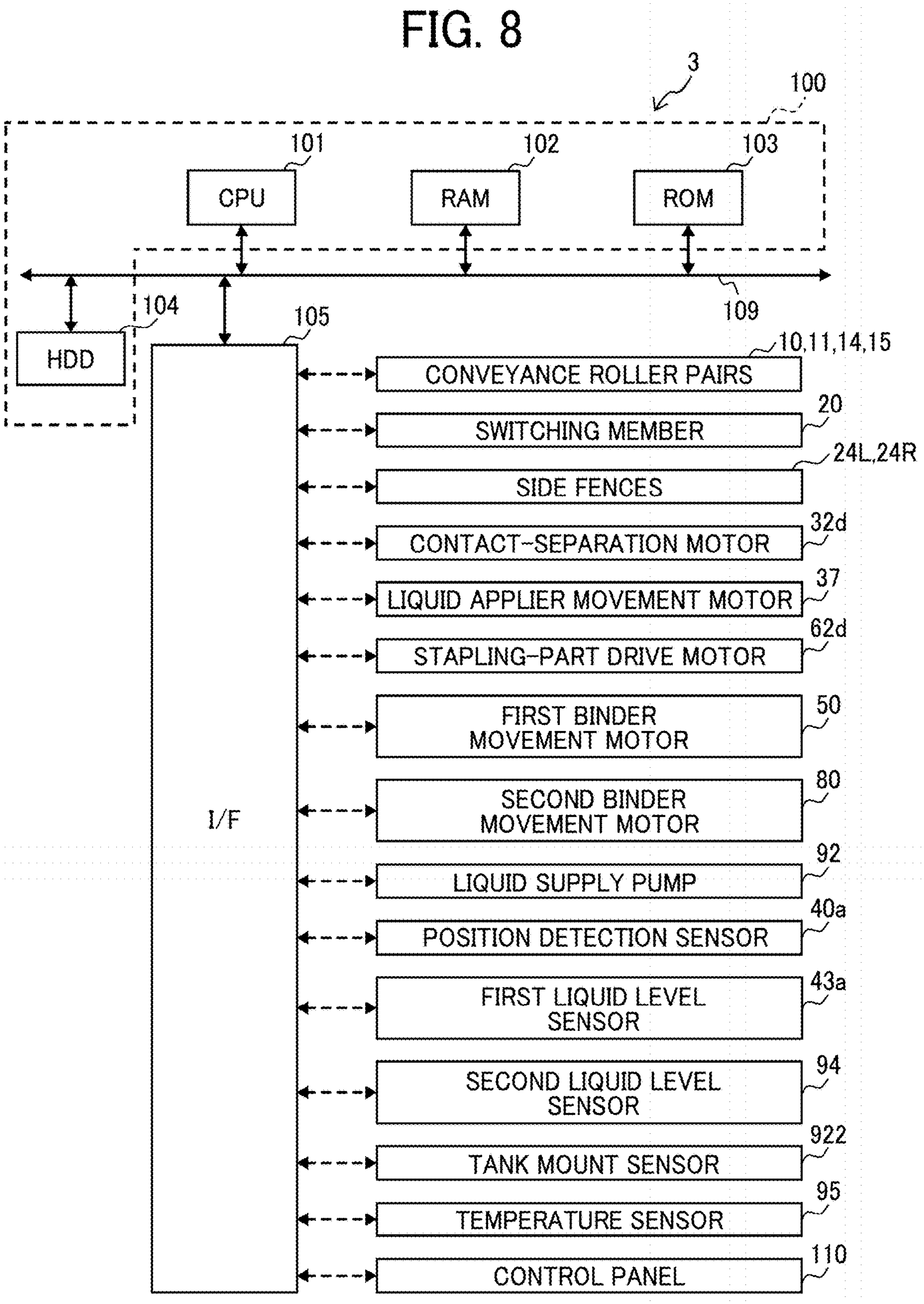
FIG. 8 is a diagram illustrating a hardware configuration of a control block for controlling an operation of a post-processing apparatus according to an embodiment of the present disclosure.

FIG. 8 illustrates a hardware configuration for executing control processing executed in the post-processing apparatus 3.

As illustrated in FIG. 8, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected each other via a common bus 109.

The CPU 101 is an arithmetic unit and controls the overall operation of the post-processing apparatus 3.

The RAM 102 is a volatile storage medium that allows data to be read and written at high speed. The CPU 101 uses the RAM 102 as a working area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 (control unit) that controls the operation of the post-processing apparatus 3.

The I/F 105 is an interface that connects the conveyance roller pairs 10, 11, 14, and 15, the switching member 20, the side fences 24L and 24R, the contact-separation motor 32*d*, the liquid applier movement motor 37, the stapling-part drive motor 62*d*, the first binder movement motor 50, the second binder movement motor 80, a liquid supply pump 92, the position detection sensor 40*a*, the first liquid level sensor 43*a*, a second liquid level sensor 94, a tank mount sensor 922, a temperature sensor 95, and a control panel 110 to the common bus 109. The controller 100 operates, via the I/F 105, the conveyance roller pairs 10, 11, 14, and 15, the switching member 20, the side fences 24L and 24R, the contact-separation motor 32*d*, the liquid applier movement motor 37, the stapling-part drive motor 62*d*, the first binder movement motor 50, the second binder movement motor 80, and the liquid supply pump 92. The controller 100 acquires detection results from the position detection sensor 40*a*, the first liquid level sensor 43*a*, the second liquid level sensor 94, the tank mount sensor 922, and the temperature sensors 95. Although FIG. 8 illustrates only the parts and components related to the edge binder 25 and the staple binder 55 that perform the edge binding, the parts and components related to the saddle binder 28 that performs the saddle binding are also controlled by the controller 100.

As illustrated in FIG. 1, the image forming apparatus 2 includes the control panel 110. The control panel 110 includes an operation device that receives instructions from a user and a display serving as a notifier that notifies the user of information. The operation device includes, for example, hard keys and a touch screen overlaid on the display. The control panel 110 acquires information from the user through the operation unit and provides the information to the user through the display. The specific example of the notifier is not limited to the display and may be, for example, a light emitting diode (LED) lamp or a speaker. The post-processing apparatus 3 may include the control panel 110 like the control panel 110 described above.

A description is given below of a first embodiment of the present disclosure.

Specifically, a medium processing apparatus according to a first embodiment of the present disclosure is described in more detail.

Figure 9:
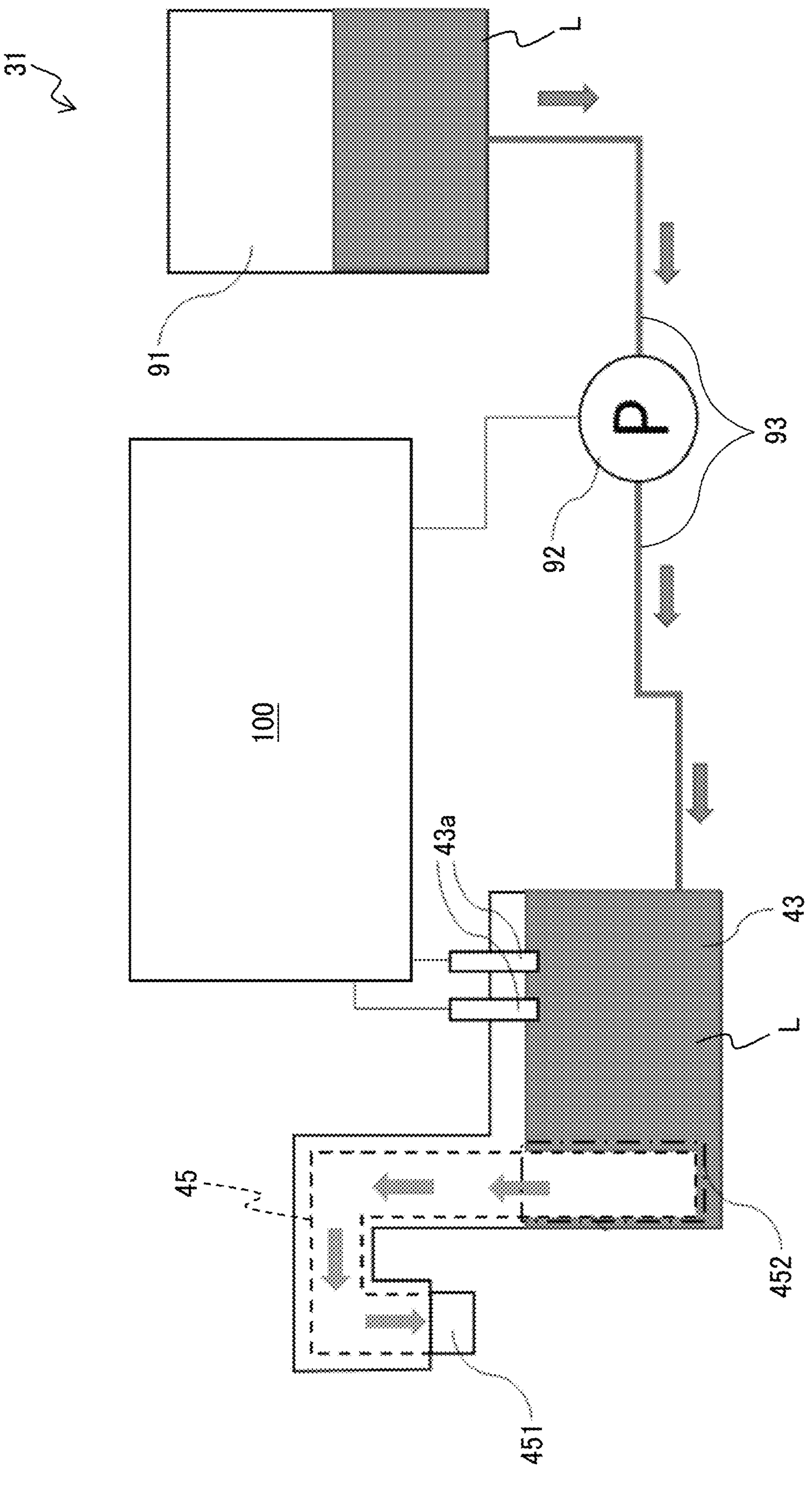
FIG. 9 is a configuration diagram of a liquid applier including a liquid application unit according to a first embodiment of the present disclosure.

FIG. 9 is a configuration diagram of the liquid applier 31 including a liquid application member the present embodiment.

The liquid applier 31 includes a liquid supply member 45 having a liquid application member 451 and a liquid immersion portion 452, a first liquid storage tank 43 as a first liquid storage, a second liquid storage tank 91 as a second liquid storage, a liquid supply pump 92 and a liquid supply passage 93 as a liquid supplier, and the controller 100 as a control unit.

As described above, the liquid supply member 45 is formed of a liquid absorber that has a portion (the liquid immersion portion 452) to be immersed in the liquid stored in the first liquid storage tank 43 and another portion (the liquid application member 451) to come into contact with a sheet P or a sheet bundle Pb to apply the liquid to the sheet P or the sheet bundle Pb.

The second liquid storage tank 91 stores liquid to be supplied to the first liquid storage tank 43. The liquid stored in the second liquid storage tank 91 is supplied to the first liquid storage tank 43 through the liquid supply passage 93 by the operation of the liquid supply pump 92.

The first liquid storage tank 43 includes the first liquid level sensor 43*a* as a first liquid detector to detect the surface of the liquid (liquid surface). The first liquid level sensor 43*a* is an electrode sensor having a pair of electrodes.

A detection signal of the first liquid level sensor 43*a* is input to the controller 100 as a control unit. The controller 100 determines the amount of liquid in the first liquid storage tank 43 based on whether the input detection signal exceeds a liquid detection threshold value (threshold value). If the controller 100 determines that the liquid is to be replenished, the controller 100 operates the liquid supply pump 92 to supply the liquid from the second liquid storage tank 91 to the first liquid storage tank 43.

The controller 100 controls the timing of application of the voltage to the electrodes of the first liquid level sensor 43*a*. The controller 100 also controls the start and stop of the operation of the liquid supply pump 92 in accordance with the detection signal of the first liquid level sensor 43*a*. When the first liquid level sensor 43*a* detects the liquid (liquid level) in the first liquid storage tank 43 by the operation of the liquid supply pump 92 according to the detection signal of the first liquid level sensor 43*a*, the controller 100 stops the operation of the liquid supply pump 92 and also stops the voltage application to the first liquid level sensor 43*a*.

The controller 100 measures the elapsed time after the operation of the liquid supply pump 92 is stopped. When the elapsed time exceeds a first predetermined time, the controller 100B energizes (i.e., applies a voltage to) the electrodes of the first liquid level sensor 43*a* and performs the detection process of detecting the liquid (liquid level) in the first liquid storage tank 43 again.

It takes time for the liquid stored in the first liquid storage tank 43 to be drawn up by the capillary phenomenon of the liquid supply member 45 and sent from the liquid immersion portion 452 to the liquid application member 451 through the liquid supply member 45. For this reason, the controller 100 detects the surface of the liquid (liquid level) in the first liquid storage tank 43 after waiting for the given time to elapse as described above. At this time, if the liquid supply member 45 draws up the liquid, the surface of the liquid stored in the first liquid storage tank 43 decreases, and the first liquid level sensor 43*a* does not detect the liquid (liquid level) in the first liquid storage tank 43, the controller 100 causes the liquid supply pump 92 again to supply the liquid from the second liquid storage tank 91 to the first liquid storage tank 43.

The detection signal of the first liquid level sensor 43*a* corresponds to an electrical signal that changes according to the amount of contact of the electrodes with the surface of the liquid in the first liquid storage tank 43. Examples of the electrical signal include, but not limited to, a signal indicating an electrical resistance value, a signal indicating a voltage value, and a signal indicating a current value. In other words, the "electrical signal" may be any signal indicating an electrical value that changes when a current passes between the electrodes (when a voltage is applied) depending on whether the pair of electrodes of the electrode sensor is immersed in the liquid.

The electrode sensor is described as an example of the first liquid level sensor 43*a* in the present embodiment. However, embodiments of the present disclosure are not limited to the electrode sensor, and any other method may be used. For example, a float sensor or a capacitance sensor may be used to detect the presence or absence of the liquid. The first liquid level sensor 43*a* is not limited to a sensor that detects the liquid level of the liquid in the first liquid storage tank 43, as long as the sensor can detect the presence or absence of the liquid in the first liquid storage tank 43.

Figure 10A:
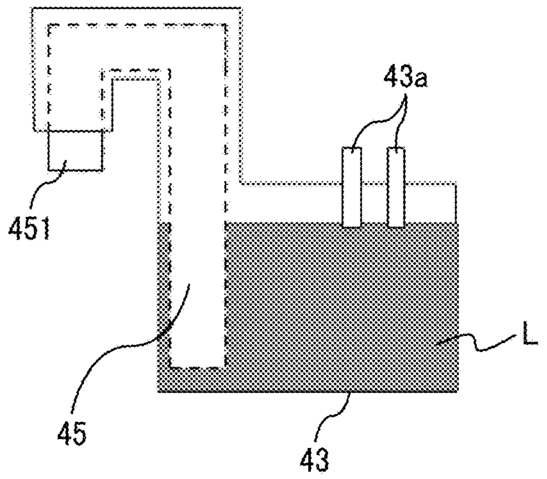
FIGS. 10A, 10B, and 10C are diagrams illustrating a change in the amount of liquid in a liquid storage tank in a dry state of a liquid supply member according to the first embodiment of the present disclosure.
Figure 10B:
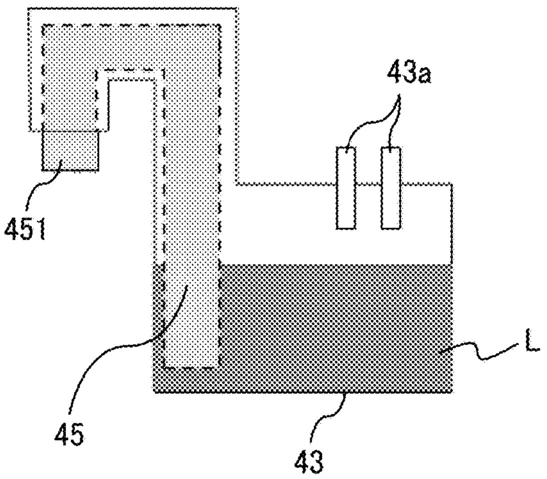
Figure 10C:
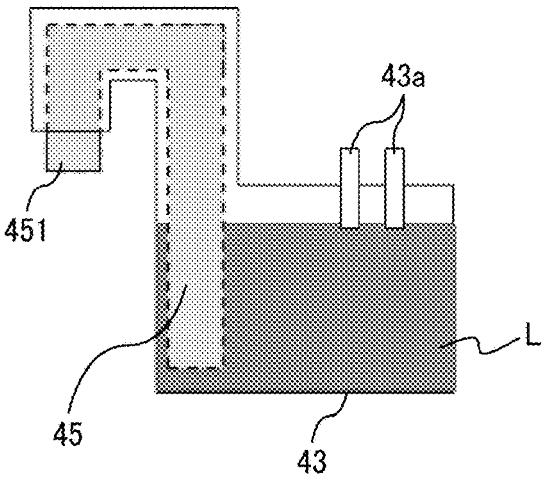

FIGS. 10A, 10B, and 10C are diagrams illustrating a change in the amount (liquid level) of the liquid stored in the first liquid storage tank 43 when the liquid supply member 45 is dry.

A change in the position of the surface of the liquid (liquid surface) is referred to as a "liquid level change" below.

As illustrated in FIG. 10A, liquid is supplied to the first liquid storage tank 43, so that the first liquid level sensor 43*a* detects the liquid surface in the first liquid storage tank 43.

At this time, the liquid supply member 45 including the liquid immersion portion 452 is dry. The position of the liquid surface (the liquid level) when the first liquid level sensor 43*a* detects the liquid surface is referred to as a "reference liquid level".

Then, as illustrated in FIG. 10B, the liquid is sucked up from the liquid immersion portion 452 by the capillary action, and the liquid supply member 45 is moistened with the sucked liquid. At this time, the amount (liquid level) of liquid stored in the first liquid storage tank 43 is lowered from the reference liquid level. At the stage when the liquid level is lowered, in other words, at the stage when the liquid supply member 45 is moistened by sucking the liquid, the controller 100 determines the electrical signal from the first liquid level sensor 43*a* again. When the controller 100 determines that the amount of liquid (liquid level) in the first liquid storage tank 43 is not at or above the reference liquid level, the controller 100 causes the liquid supply pump 92 to start the operation to supply liquid again.

In the case where an electrode sensor is used as the first liquid level sensor 43*a*, there is a concern that the metal used for the electrodes might be corroded due to electrolytic corrosion if the pair of electrodes is energized (applied with electricity) constantly. Further, since the voltage is always applied to the liquid stored in the first liquid storage tank 43, there is a concern that the liquid might be electrolyzed or that the electrodes might be dissolved due to adhesion of foreign matter to the surface of the electrodes by electrolysis, which might induce deterioration of the electrodes. For this reason, the controller 100 controls the timing of the energization of the first liquid level sensor 43*a* such that the first liquid level sensor 43*a* is not energized all the time but is energized only when the determination process of the change in the amount of liquid (liquid level) stored in the first liquid storage tank 43 is executed.

A description is given below of the liquid supply determination process.

Figure 11A:
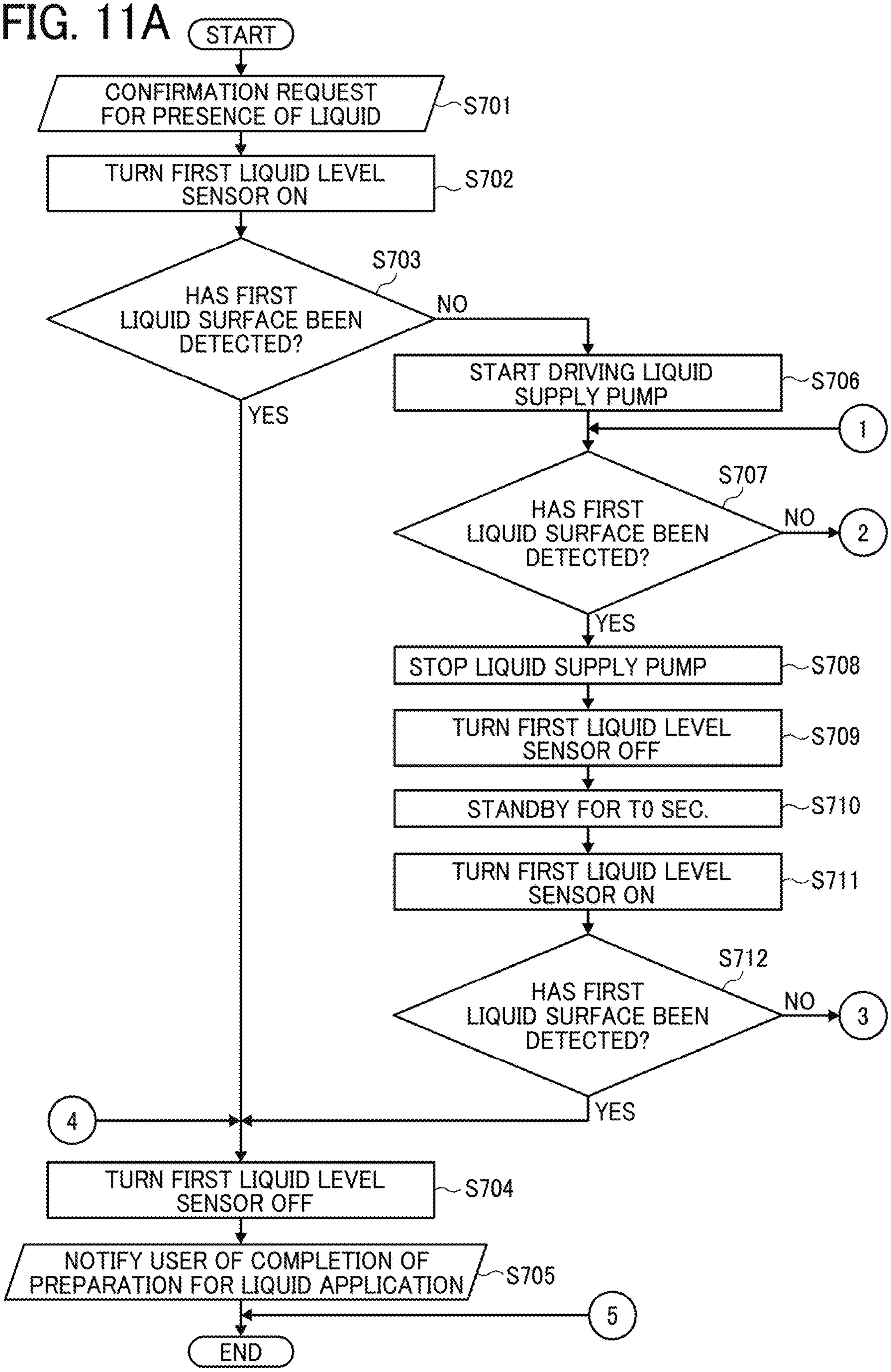
FIGS. 11A and 11B are a flowchart of a liquid supply determination process according to the first embodiment of the present disclosure.
Figure 11B:
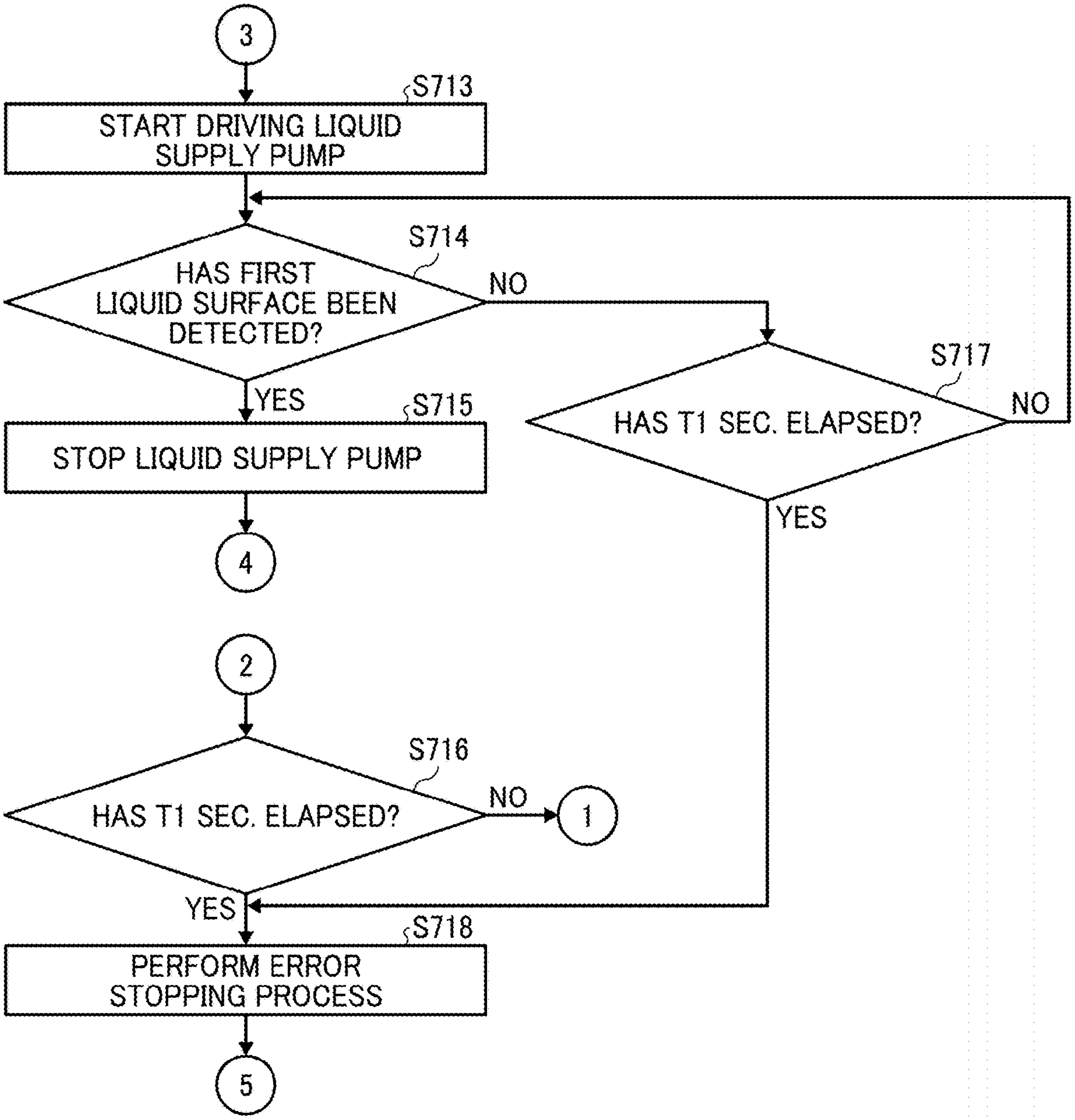

FIG. 11 including FIGS. 11A and 11B is a flowchart of the liquid supply determination process executed in the controller 100.

The liquid supply determination process according to the present embodiment is executed at the time of starting the post-processing apparatus 3 or at the time of starting the crimping process.

For example, when the post-processing apparatus 3 is activated, the liquid supply determination process is started, and a liquid presence check request is instructed to the controller 100 in step S701. The instruction of the liquid presence check request may be based on information input by the user from the control panel 110. Following the liquid presence check request, in step S702, the controller 100 applies a voltage to the first liquid level sensor 43*a* (i.e., turns the first liquid level sensor 43*a* on).

In step S703, the controller 100 acquires a value of an electrical signal (referred to as an "output value") output when the first liquid level sensor 43*a* detects the surface of the liquid in the first liquid storage tank 43, and determines the presence or absence of the liquid (the amount of the liquid stored) in the first liquid storage tank 43. The presence or absence of liquid is determined based on whether the output value (voltage) output from the first liquid level sensor 43*a* exceeds a "liquid detection threshold value" (threshold value) set in advance. For example, when the output value (voltage) from the first liquid level sensor 43*a* is equal to or greater than the liquid detection threshold value (e.g., the output voltage VTh1), the controller 100 determines that there is a sufficient amount of liquid in the first liquid storage tank 43 (YES in step S703). In this case, the controller 100 stops the application of the voltage to the first liquid level sensor 43*a* (turns the first liquid level sensor 43*a* off) in step S704, and displays a completion notice of the preparation for liquid application on, for example, the control panel 110 in step S705, and ends the liquid supply determination process.

Alternatively, when the output value from the first liquid level sensor 43*a* is less than the liquid detection threshold value (e.g., the output voltage VTh1) (NO in step S703), in step S706, the controller 100 causes the liquid supply pump 92 to supply the liquid from the second liquid storage tank 91 to the first liquid storage tank 43.

Subsequently, when the output value (voltage) from the first liquid level sensor 43*a* is equal to or greater than the liquid detection threshold value (e.g., the output voltage VTh1), the controller 100 determines that there is a sufficient amount of liquid in the first liquid storage tank 43 (YES in step S707). Alternatively, when the output value (voltage) from the first liquid level sensor 43*a* is less than the liquid detection threshold value (e.g., the output voltage VTh1) (NO in step S707) and the elapsed time after the operation start of the liquid supply pump 92 (i.e., after step S706) does not exceed the abnormality determination time (T1 seconds) (NO in step S716), the liquid supply pump 92 continues to supply the liquid from the second liquid storage tank 91 to the first liquid storage tank 43 until the output value (voltage) from the first liquid level sensor 43*a* becomes equal to or greater than the liquid detection threshold value (e.g., the output voltage VTh1) (YES in step S707).

If the output value from the first liquid level sensor 43*a* does not become equal to or greater than the liquid surface (e.g., the output voltage VTh1) by the time when the abnormality determination time (T1 seconds) has elapsed (NO in step S707 and YES in step S716), the controller 100 determines that some abnormality has occurred in a device (for example, a failure in the first liquid level sensor 43*a*), and performs an error stop process (abnormality notification) of stopping the liquid supply pump 92 and turning the first liquid level sensor 43*a* off in step S718, and ends the liquid supply determination process.

In step S707, when the output value (voltage) from the first liquid level sensor 43*a* becomes equal to or greater than the liquid detection threshold value (e.g., the output voltage VTh1) (YES in step S707), in step S708, the controller 100 stops the liquid supply pump 92 to stop the supply of the liquid from the second liquid storage tank 91 to the first liquid storage tank 43. In step S709, the controller 100 stops the application of the voltage to the first liquid level sensor 43*a* (i.e., turns the first liquid level sensor 43*a* off).

Then, in step S710, the controller 100 temporarily stops the liquid supply determination process until a standby time (first predetermined time TO), which is set in advance as a time until the liquid supply member 45 completes the sucking of the liquid, has elapsed.

After the standby time (T0) has elapsed, the controller 100 turns the first liquid level sensor 43*a* on again in step S711, to determine the presence or absence of the liquid in the first liquid storage tank 43. At this stage, the (liquid storage amount) of the liquid in the first liquid storage tank 43 is lowered by the suction of the liquid supply member 45. However, if the output value from the first liquid level sensor 43*a* is equal to or greater than the liquid detection threshold value (e.g., the output voltage VTh1) (YES in step S712), in step S704, the controller 100 stops the application of the voltage to the first liquid level sensor 43*a* (i.e., turns the first liquid level sensor 43*a* off). In step S705, the controller 100 displays a completion notice of the preparation for liquid application on, for example, the control panel 110, and ends the liquid supply determination process.

On the other hand, when the output value (voltage) from the first liquid level sensor 43*a* is less than the liquid detection threshold value (e.g., the output voltage VTh1) in S712 (NO in step S712), in step S713, the controller 100 operates the liquid supply pump 92 to supply the liquid from the second liquid storage tank 91 to the first liquid storage tank 43.

Subsequently, when the output value (voltage) from the first liquid level sensor 43*a* is equal to or greater than the liquid detection threshold value (e.g., the output voltage VTh1), the controller 100 determines that there is a sufficient amount of liquid in the first liquid storage tank 43 (YES in step S714). In this case, in step S715, the liquid supply pump 92 stops the operation of supplying liquid. Then, the controller 100 stops the application of the voltage to the first liquid level sensor 43*a* (turns the first liquid level sensor 43*a* off) in step S704, displays a completion notice of the preparation for liquid application on, for example, the control panel 110 in step S705, and ends the liquid supply determination process.

On the other hand, when the output value (voltage) from the first liquid level sensor 43*a* is less than the liquid detection threshold value (e.g., the output voltage VTh1) (NO in step S714) and the elapsed time after the operation start of the liquid supply pump 92 (i.e., after step S713) does not exceed the abnormality determination time (T1 seconds) (NO in step S717), the liquid supply pump 92 continues to supply the liquid from the second liquid storage tank 91 to the first liquid storage tank 43 until the output value (voltage) from the first liquid level sensor 43*a* becomes equal to or greater than the liquid detection threshold value (e.g., the output voltage VTh1) (YES in step S714).

If the output value from the first liquid level sensor 43*a* does not become equal to or greater than the liquid detection threshold value (e.g., the output voltage VTh1) by the time when the abnormality determination time (T1 seconds) has elapsed (NO in step S714 and YES in step S717), in step S718, the controller 100 determines that some abnormality has occurred in a device (for example, a failure in the first liquid level sensor 43*a*), and performs an error stop process of stopping the liquid supply pump 92 and turning the first liquid level sensor 43*a* off.

A description is given below of the relation between the liquid supply determination process described above, with reference to FIGS. 10A, 10B, and 10C.

First, when the presence or absence of the liquid in the first liquid storage tank 43 is confirmed in the stage preceding to the state illustrated in FIG. 10A, the controller 100 determines that the liquid surface of the liquid in the first liquid storage tank 43 is not detected and the result is "no liquid" (NO in step S703), the controller 100 drives the liquid supply pump 92 to supply the liquid from the refill to the first liquid storage tank 43 in step S706. Then, when the stage enters to the state illustrated in FIG. 10A, the controller 100 stops the liquid supply pump 92 (YES in step S707).

Subsequently, when the standby time (T0) set in advance as the time that the liquid supply member 45 draws up liquid as illustrated in FIG. 10B, the liquid surface (liquid level) is lowered, and the output value (voltage) from the first liquid level sensor 43*a* is less than the liquid detection threshold value (e.g., the output voltage VTh1) (No in step S712). Then, the controller 100 operates the liquid supply pump 92 to supply the liquid from the second liquid storage tank 91 to the first liquid storage tank 43, so that the stage enters the state illustrated in FIG. 10C (YES in step S714).

A description is given of the configuration of the liquid applier 31 according to an embodiment of the present disclosure.

Figure 12A:
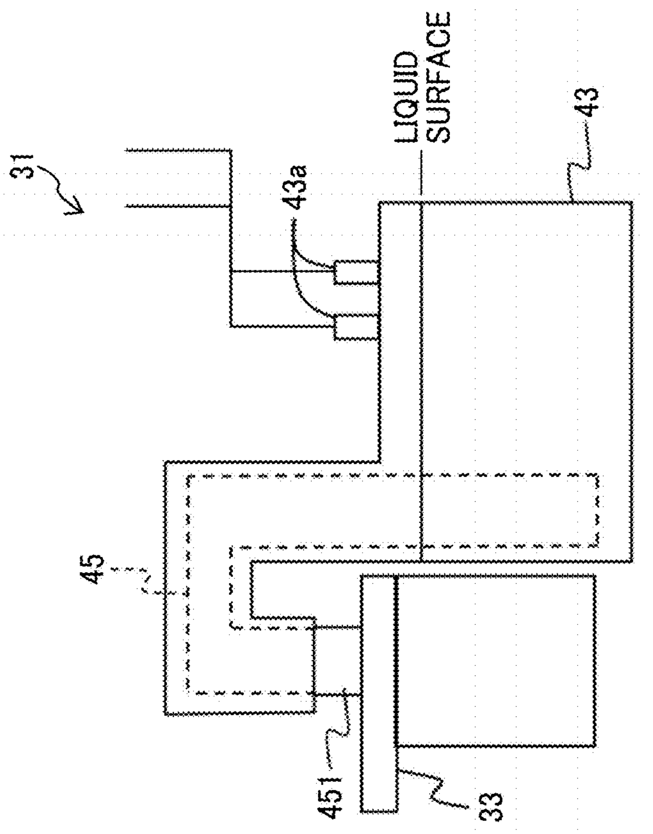
FIGS. 12A and 12B are schematic views of the liquid applier when the liquid application member is at the liquid application position and the separation position.

FIG. 12A is a schematic diagram illustrating the liquid applier 31 when the liquid application member 451 is at the liquid application position.

Figure 12B:
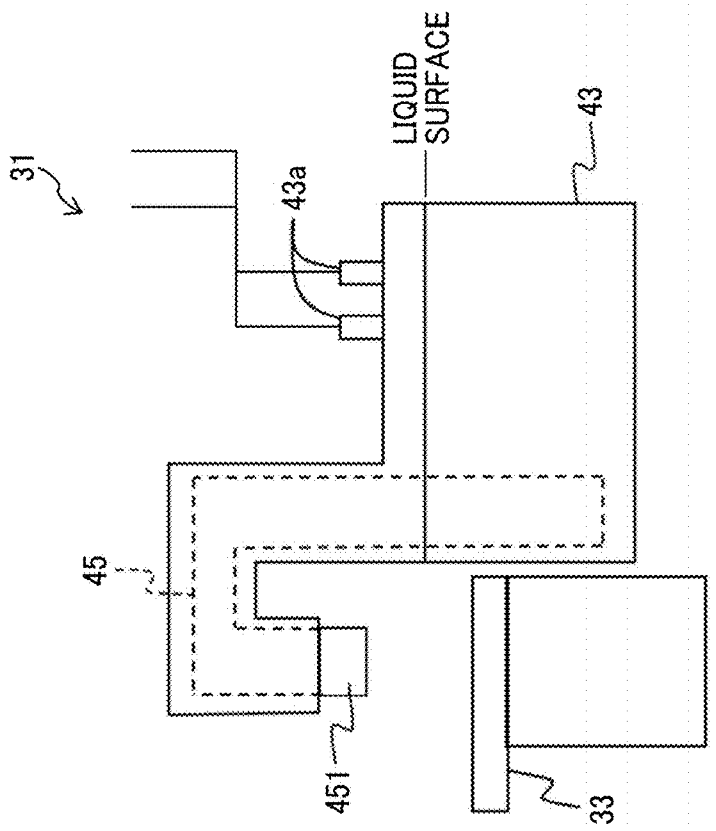

FIG. 12B is a schematic diagram illustrating the liquid applier 31 when the liquid application member 451 is at the separation position.

As illustrated in FIGS. 12A and 12B, the liquid applier 31 includes the first liquid storage tank 43 (as an example of a liquid storage), the first liquid level sensor 43*a*, the liquid supply member 45, the liquid application member 451, and a contact-separation motor 32*d* as an example of a contact-separation unit (see FIG. 8). The basic configuration of each component is as described above.

The first liquid storage tank 43 has a shape of a box that stores liquid. The first liquid level sensor 43*a* detects the amount of liquid stored in the first liquid storage tank 43. The liquid supply member 45 has one end that is immersed in the liquid stored in the first liquid storage tank 43. The liquid supply member 45 has the other end to which the liquid application member 451 is attached. The space between the one end and the other end of the liquid supply member 45 is exposed from the liquid stored in the first liquid storage tank 43. The liquid application member 451 is attached to the other end of the liquid supply member 45 at an upward portion of the lower pressure plate 33, in other words, at a position to face the sheet P that is supported by the lower pressure plate 33. The liquid stored in the first liquid storage tank 43 is drawn up to the liquid supply member 45 by the capillary action of the liquid supply member 45, and is supplied to the liquid application member 451 attached to the other end of the liquid supply member 45.

The contact-separation motor 32*d* moves the first liquid storage tank 43, the liquid supply member 45, and the liquid application member 451 in a single unit in the vertical direction. The liquid application member 451 that is moved in the vertical direction by the contact-separation motor 32*d* moves in the vertical direction between a liquid application position illustrated in FIG. 12A and a separation position illustrated in FIG. 12B. The liquid application position is a position of the liquid application member 451 when the liquid application member 451 comes into contact the sheet P supported by the lower pressure plate 33 and applies the liquid to the sheet P. The separation position is a position of the liquid application member 451 separated toward upward from the sheet P supported by the lower pressure plate 33. In other words, the liquid application position and the separation position are separated from each other in the vertical direction.

Since there is a limit to the supply speed of liquid to the liquid application member 451 by the capillary action, it is not likely that the supply of liquid to the liquid application member 451 is made in time as the frequency of liquid application by the liquid applier 31 increases. As a result, the first issue that the amount of liquid to be applied to the sheet P by the liquid applier 31 is unstable rises. In addition, when the liquid application is interrupted before a sufficient amount of liquid is supplied to the liquid application member 451, the second problem occurs in that the productivity of the liquid applier 31 is decreased.

In order to deal with such a situation, a description is given of liquid supply facilitating mechanisms 200A to 200F according to the present disclosure, with reference to FIGS. 13A to 18C.

The first liquid level sensor 43*a* is not depicted in FIGS. 13A to 18C for simplicity.

The liquid supply facilitating mechanisms 200A to 200F are mechanisms to increase the contact area of the liquid stored in the first liquid storage tank 43 and the liquid supply member 45 in response to a movement of the liquid application member 451 from the liquid application position to the separation position. To be more specific, the liquid supply facilitating mechanisms 200A, 200*b*, and 200C illustrated in FIGS. 13A to 15B increase the surface (liquid level) of the liquid stored in the first liquid storage tank 43, in other words, increase the area to be immersed in the liquid of the liquid supply member 45. The liquid supply facilitating mechanisms 200D, 200E, and 200F are mechanisms to supply the droplets of the liquid stored in the first liquid storage tank 43, to the portion exposed from the liquid of the liquid supply member 45.

Figure 13B:
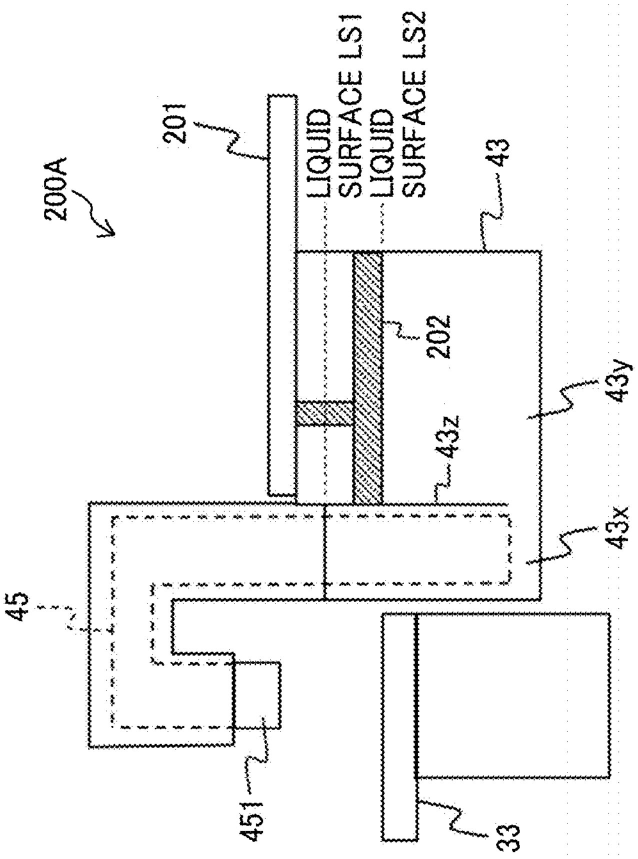
FIGS. 13A and 13B are diagrams each illustrating an example of a liquid supply facilitating mechanism.
Figure 13A:
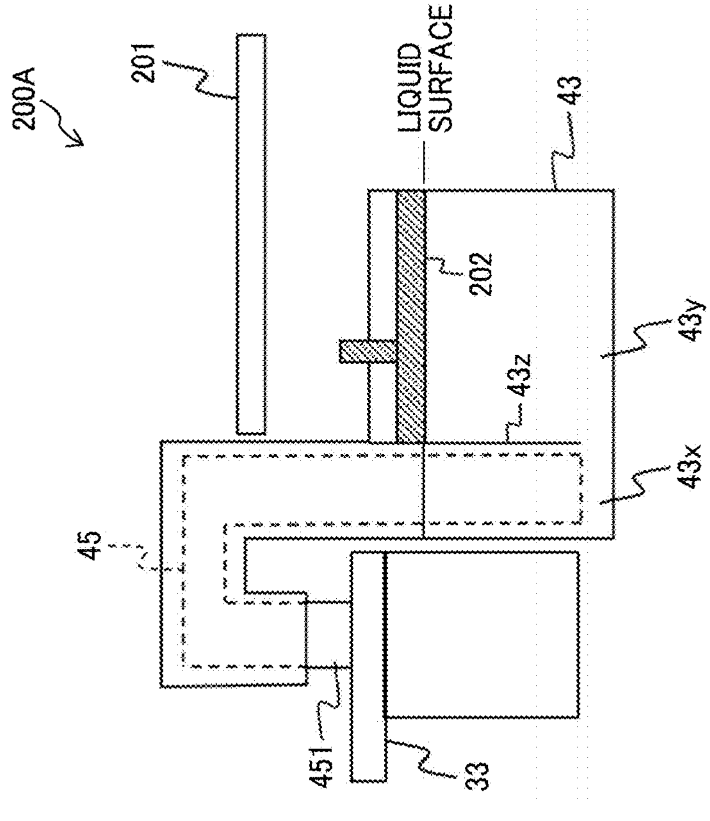

FIGS. 13A and 13B are diagrams each illustrating an example of the liquid supply facilitating mechanism 200A.

As illustrated in FIGS. 13A and 13B, the interior of the first liquid storage tank 43 is divided into a first chamber 43*x* and a second chamber 43*y*. The first chamber 43*x* and the second chamber 43*y* are horizontally adjacent to each other. The first chamber 43*x* and the second chamber 43*y* are separated by a partition wall 43*z* extending in the vertical direction. Further, the first chamber 43*x* and the second chamber 43*y* communicate with each other at the lower end of the first liquid storage tank 43.

The liquid supply member 45 has one end that is immersed in the liquid in the first chamber 43*x*. The liquid supply facilitating mechanism 200A adjusts the liquid level (liquid surface) of in the second chamber 43*y*. The liquid supply facilitating mechanism 200A includes a pressing member 201 and a lowering member 202. The pressing member 201 is fixed to the liquid application frame 31*a* above the first liquid storage tank 43 (more specifically, the second chamber 43*y*). The lowering member 202 tightly closes the upper face of the second chamber 43*y*. The lowering member 202 pushes down the liquid surface of the second chamber 43*y* in response to a movement of the liquid application member 451 from the liquid application position to the separated position.

As illustrated in FIG. 13A, when the liquid application member 451 is at the liquid application position, the lowering member 202 is separated from the pressing member 201 and floats on the liquid surface of the second chamber 43*y*. The lowering member 202 moves together with the first liquid storage tank 43 in response to an upward movement of the liquid application member 451 from the liquid application position. Further, the lowering member 202 contacts the pressing member 201 before the liquid application member 451 reaches the separation position. When the first liquid storage tank 43, the liquid supply member 45, and the liquid application member 451 further move upward with the lowering member 202 in contact with the pressing member 201, the lowering member 202 moves downward in the second chamber 43*y* to lower a liquid surface LS2 of the second chamber 43*y*, as illustrated in FIG. 13B. Accordingly, a liquid surface LS1 (liquid level) of the first chamber 43*x* increases by the liquid moved from the second chamber 43*y* to the first chamber 43*x*.

As a result, the area that is immersed in the liquid of the liquid supply member 45 increases in response to the movement of the liquid application member 451 from the liquid application position to the separation position.

The horizontal cross-sectional area of the second chamber 43*y* is preferably greater than the horizontal cross-sectional area of the first chamber 43*x*. Due to such a configuration, the amount of elevation of the liquid level (liquid surface) in the first chamber 43*x* when the liquid surface in the second chamber 43*y* is pushed down by the lowering member 202. With this configuration, the contact area of the liquid supply member 45 and the liquid can be further increased.

Figure 14A:
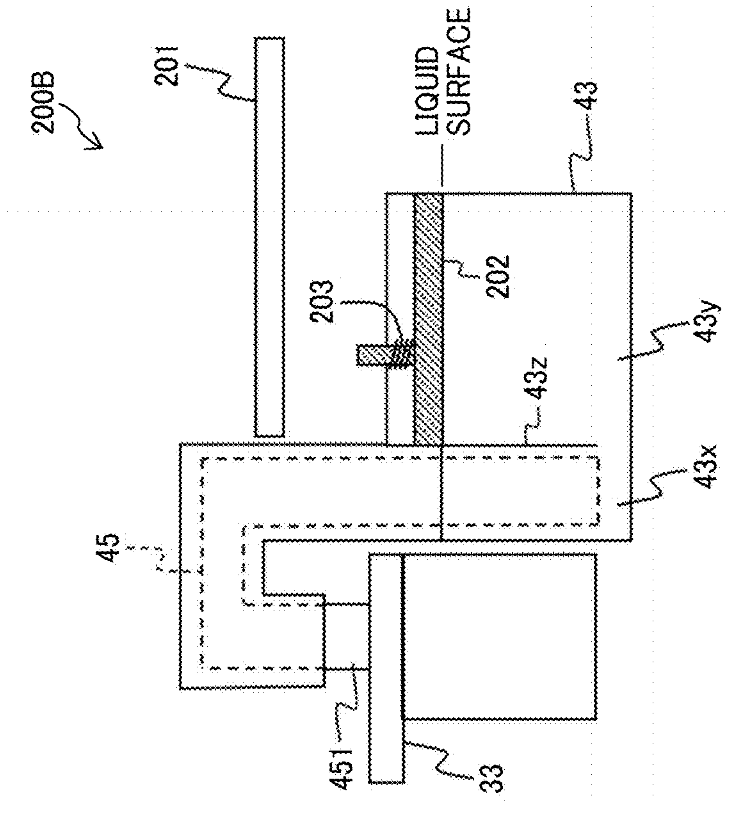
FIGS. 14A and 14B are diagrams each illustrating another example of a liquid supply facilitating mechanism.
Figure 14B:
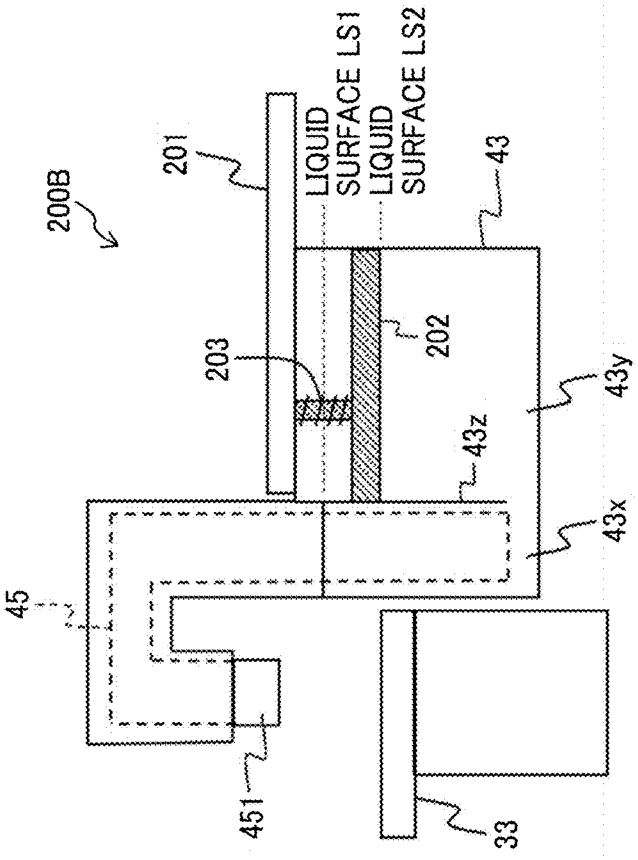

FIGS. 14A and 14B are diagrams each illustrating an example of the liquid supply facilitating mechanism 200B.

As illustrated in FIGS. 14A and 14B, the liquid supply facilitating mechanism 200B includes the pressing member 201, the lowering member 202, and a coil spring 203 (an example of a biasing member). One end of the coil spring 203 is fixed to the ceiling of the second chamber 43*y* and the other end of the coil spring 203 is fixed to the top face of the lowering member 202. The coil spring 203 does not exert the biasing force when the coil spring 203 is compressed as illustrated in FIG. 14A. The coil spring 203 is extended as illustrated in FIG. 14B to bias the lowering member 202 in a direction opposite to the direction in which the liquid surface (liquid level) of the second chamber 43*y* is pushed down (i.e., upward). The other configurations are common to the liquid supply facilitating mechanism 200A illustrated in FIGS. 13A and 13B.

The lowering member 202 moves in the direction in which the liquid surface (liquid level) of the second chamber 43*y* is pushed down (i.e., downward) against the biasing force of the coil spring 203 in response to a movement of the liquid application member 451 from the liquid application position to the separation position (from the state in FIG. 14A to the state in FIG. 14B). On the other hand, the lowering member 202 moves in the direction in which the liquid surface (liquid level) of the second chamber 43*y* is pushed down (i.e., upward) due to the biasing force of the coil spring 203 in response to a movement of the liquid application member 451 from the separation position to the liquid application position (from the state in FIG. 14B to the state in FIG. 14A). Accordingly, in response to the movement of the liquid application member 451 from the separated position to the liquid applying position, the downward pressing of the liquid surface of the second chamber 43*y* by the lowering member 202 can be released.

Figure 15B:
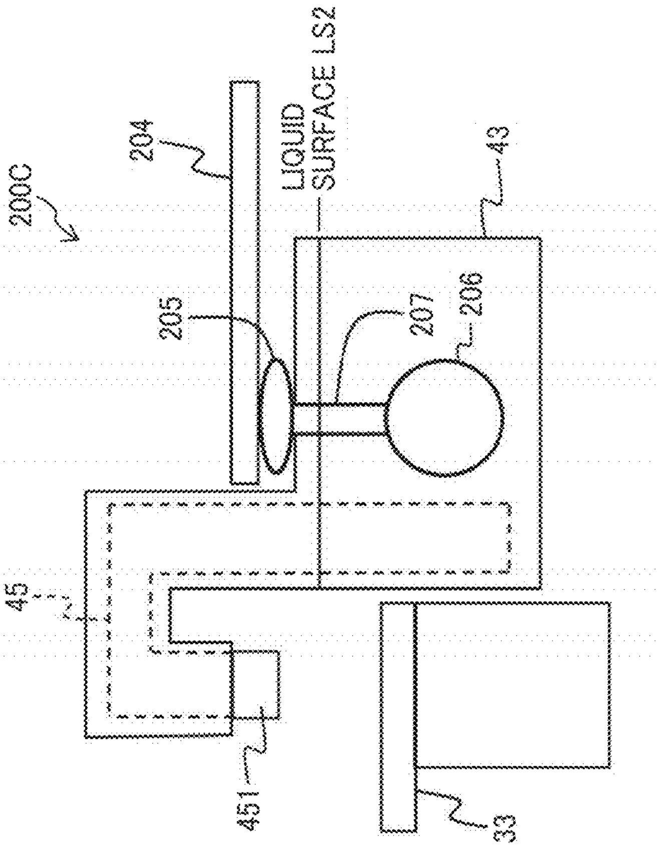
FIGS. 15A and 15B are diagrams each illustrating yet another example of a liquid supply facilitating mechanism.
Figure 15A:
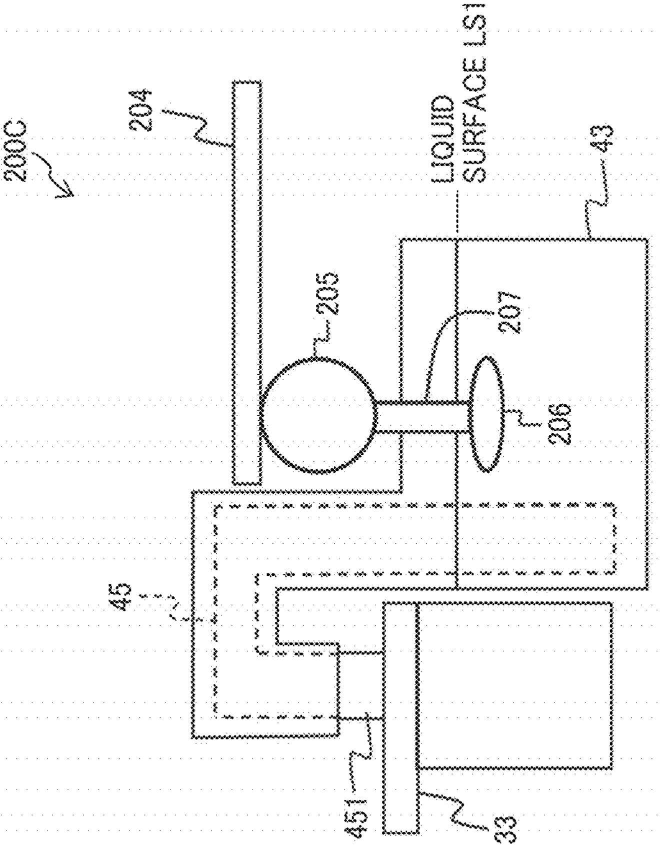

FIGS. 15A and 15B are diagrams each illustrating an example of the liquid supply facilitating mechanism 200C.

As illustrated in FIGS. 15A and 15B, the liquid supply facilitating mechanism 200C includes a compression member 204, a first bag portion 205, a second bag portion 206, and a communication portion 207. The compression member 204 is fixed to the liquid application frame 31*a* above the first liquid storage tank 43. In addition, the compression member 204 compresses the first bag portion 205 in response to the movement of the liquid application member 451 from the liquid application position to the separated position (from the state in FIG. 15A to the state in FIG. 15B). Further, the compression member 204 releases the compression of the first bag portion 205 in response to the movement of the liquid application member 451 from the separated position to the liquid applying position (from the state in FIG. 15B to the state in FIG. 15A).

The first bag portion 205 and the second bag portion 206 are bag-shaped members that are expandable and contractible (expandable and contractible). The first bag portion 205 is disposed higher than the liquid level (liquid surface) of the first liquid storage tank 43. The second bag portion 206 is dispose in the liquid stored in the first liquid storage tank 43. The communication portion 207 communicates the inside of the first bag portion 205 and the second bag portion 206. The first bag portion 205, the second bag portion 206, and the communication portion 207 contain air in an amount that allows one of the first bag portion 205 and the second bag portion 206 to be expanded (inflated) and the other to be compressed. Further, the first bag portion 205, the second bag portion 206, and the communication portion 207 move in the vertical direction together with the first liquid storage tank 43.

As illustrated in FIG. 15A, when the liquid application member 451 is at the liquid application position, the compression of the first bag portion 205 by the compression member 204 is released. Accordingly, the second bag portion 206 is compressed by the liquid pressure of the liquid in the first liquid storage tank 43, and the first bag portion 205 is expanded by the air moved through the communication portion 207. The first bag portion 205, the second bag portion 206, and the communication portion 207 move together with the first liquid storage tank 43 in response to the upward movement of the liquid application member 451 from the liquid application position. Further, the first bag portion 205 contacts the compression member 204 before the liquid application member 451 reaches the separation position.

When the first liquid storage tank 43, the liquid supply member 45, and the liquid application member 451 further move upward with the first bag portion 205 in contact with the compression member 204, the air in the first bag portion 205 compressed by the compression member 204 moves to the second bag portion 206 through the communication portion 207, as illustrated in FIG. 15B. Accordingly, the second bag portion 206 expanded against the liquid pressure of the liquid pushes up the liquid surface (liquid level) of the first liquid storage tank 43 from the liquid surface LS1 to the liquid surface LS2. As a result, the area that is immersed in the liquid of the liquid supply member 45 increases in response to the movement of the liquid application member 451 from the liquid application position to the separation position.

Figure 16A:
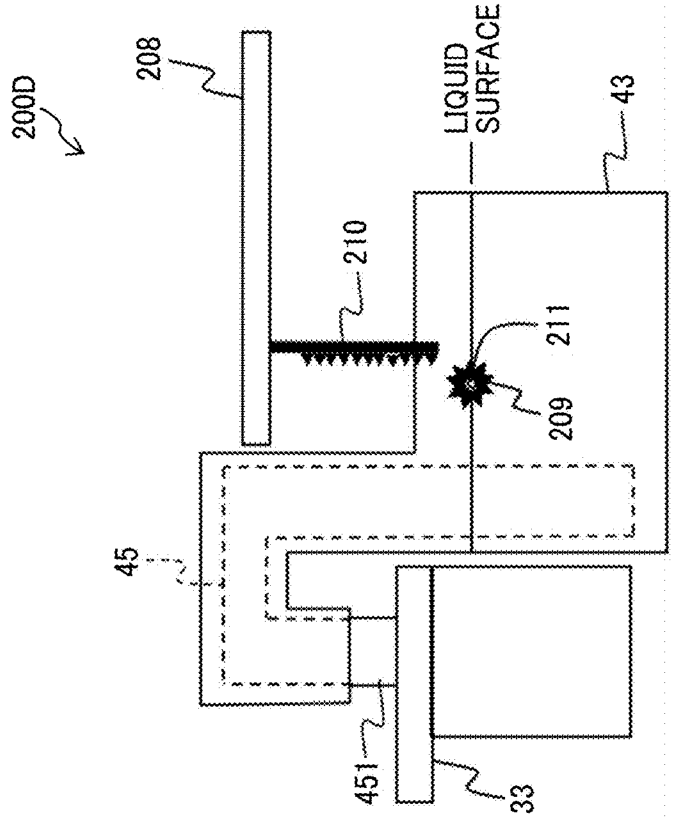
FIGS. 16A and 16B are diagrams each illustrating yet another example of a liquid supply facilitating mechanism.
Figure 16B:
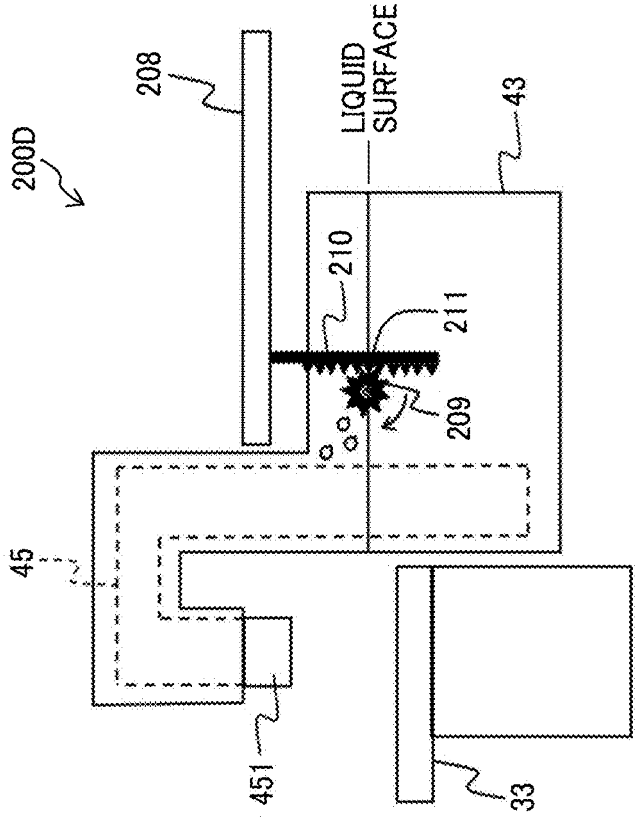

FIGS. 16A and 16B are diagrams each illustrating an example of the liquid supply facilitating mechanism 200C.

Figure 17A:
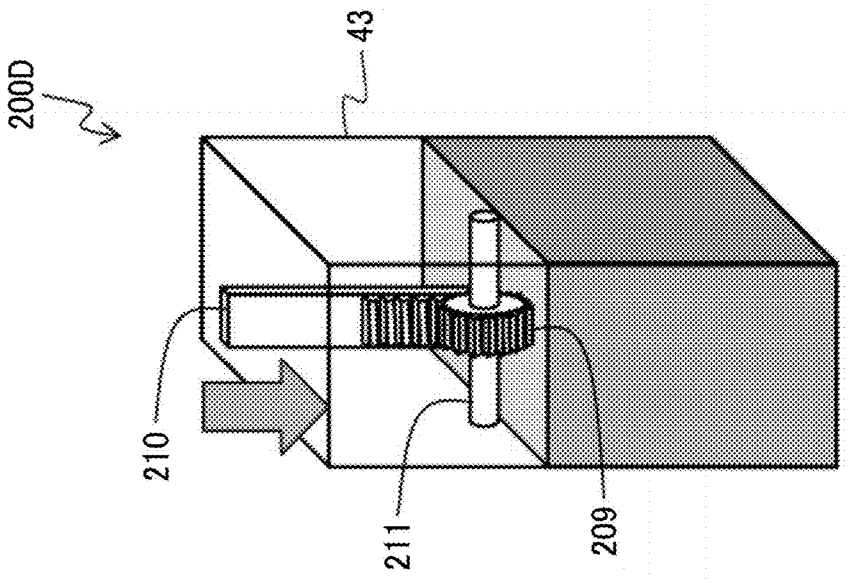
FIGS. 17A and 17B are perspective views of a liquid supply facilitating mechanism.
Figure 17B:
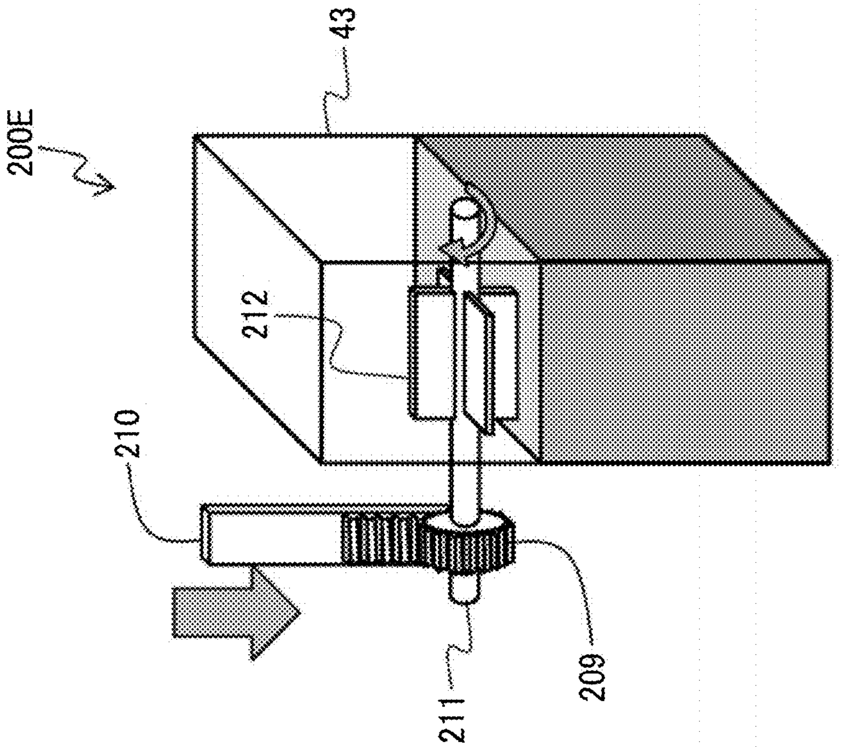

FIGS. 17A and 17B are perspective views of the liquid supply facilitating mechanisms 200D and 200E.

As illustrated in FIGS. 16 and 17A, the liquid supply facilitating mechanism 200D includes a support 208, a pinion 209, a rack 210, and a pivot shaft 211. The support 208 is fixed to the liquid application frame **31*a* above the first liquid storage tank 43. The pinion 209 of the cylindrical gear and the rack 210** in which the teeth are linearly arranged on a surface of a long rod shape are included in a so-called "rack and pinion mechanism".

The pinion 209 is pivotably supported on the pivot shaft 211 that extends in the horizontal direction in the first liquid storage tank 43. The pinion 209 has a part (lower portion) that is immersed in the liquid stored in the first liquid storage tank 43 and another part (upper portion) that is exposed from the liquid stored in the first liquid storage tank 43. Further, the pinion 209 has the outer circumferential face (teeth) that is disposed facing the liquid supply member 45. The rack 210 extends downward from the support 208 at a position where the teeth of the rack 210 can mesh with the teeth of the pinion 209.

As illustrated in FIG. 16A, when the liquid application member 451 is at the liquid application position, the pinion 209 and the rack 210 may be separated from each other or may be in mesh with each other. The pinion 209 moves upward together with the first liquid storage tank 43 in response to the upward movement of the liquid application member 451 from the liquid application position. The pinion 209 and the rack 210 mesh with each other before the liquid application member 451 reaches the separated position.

When the first liquid storage tank 43, the liquid supply member 45, and the liquid application member 451 are further raised with the pinion 209 and the rack 210 engaged with each other, as illustrated in FIG. 16B, the pinion 209 rotates in a direction (in other words, clockwise in FIG. 16B) in which the droplets of the liquid stored in the first liquid storage tank 43 are scattered toward the liquid supply member 45. Due to such a configuration, the droplets of the liquid can be supplied to the area exposed from the liquid of the liquid supply member 45 in response to the movement of the liquid application member 451 from the liquid application position to the separation position.

As illustrated in FIG. 17B, the liquid supply facilitating mechanism 200E includes the support 208, the pinion 209, the rack 210, the pivot shaft 211, and an impeller 212. The pinion 209 and the rack 210 of the liquid supply facilitating mechanism 200E have a basic configuration in common with the liquid supply facilitating mechanism 200D, and are different from the liquid supply facilitating mechanism 200D in that the pinion 209 and the rack 210 of the liquid supply facilitating mechanism 200E are disposed outside the first liquid storage tank 43.

The impeller 212 is a member in which multiple blades are radially arranged at positions spaced apart in the circumferential direction of the outer circumferential surface of the cylinder. Further, the impeller 212 is pivotably supported on the pivot shaft 211 that extends in the horizontal direction in the first liquid storage tank 43. In other words, the impeller 212 rotates integrally with the pinion 209. Further, the impeller 212 has a part (lower portion) that is immersed in the liquid stored in the first liquid storage tank 43 and another part (upper portion) that is exposed from the liquid stored in the first liquid storage tank 43. Further, the impeller 212 has the outer circumferential face (teeth) that is disposed facing the liquid supply member 45.

The pinion 209 and the impeller 212 rotate together in a direction in which droplets of the liquid stored in the first liquid storage tank 43 toward the liquid supply member 45 in response to the movement of the liquid application member 451 from the liquid application position to the separation position. According to the configuration of FIG. 17B, since the degree of freedom of the shape of the impeller 212 is high, the amount of droplets supplied to the liquid supply member 45 can be increased.

Figure 18A:
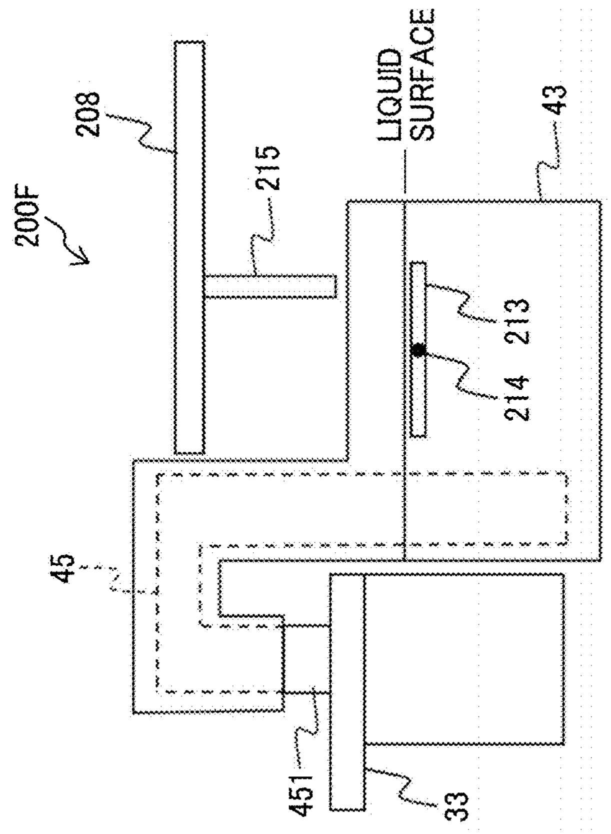
FIGS. 18A, 18B, and 18C are diagrams each illustrating an example of a liquid supply facilitating mechanism.
Figure 18B:
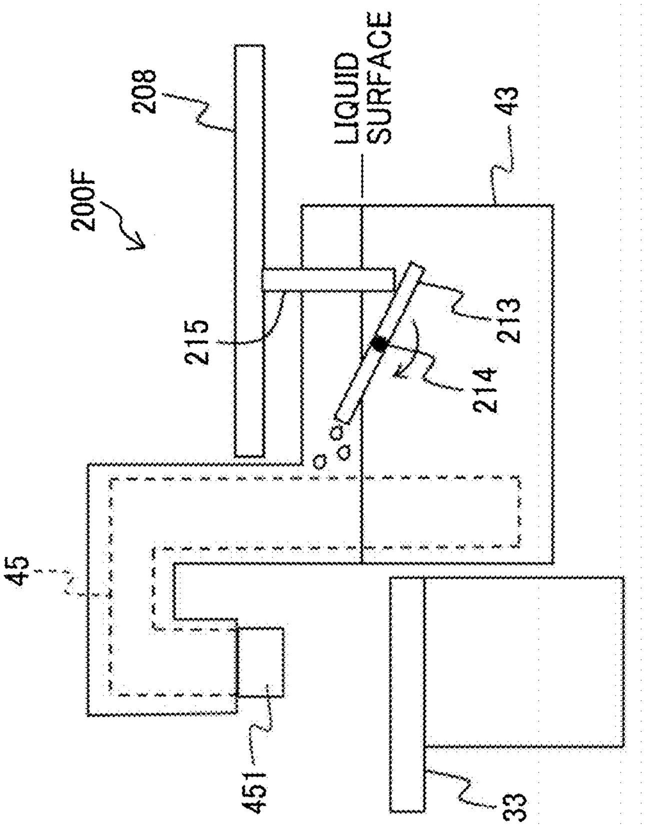
Figure 18C:
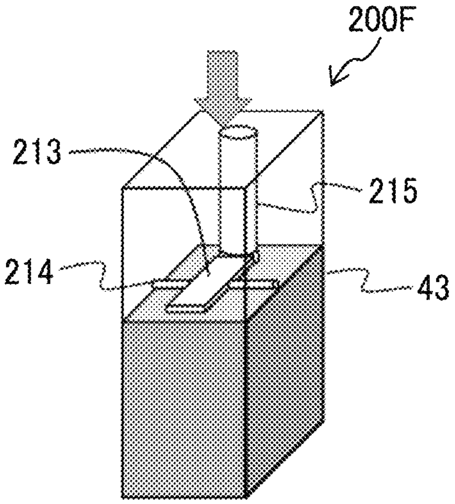

FIGS. 18A, 18B, and 18C are diagrams each illustrating an example of the liquid supply facilitating mechanism 200F.

As illustrated in FIGS. 18A, 18B, and 18C, the liquid supply facilitating mechanism 200F includes the support 208, the pivot member 213, the pivot shaft 214, and the pressing member 215. The pivot member 213 is a planar member. Further, the pivot member 213 is pivotably supported on the pivot shaft 214 that extends in the horizontal direction in the first liquid storage tank 43. Further, the pivot member 213 has a first end portion on a side closer to the liquid supply member 45 than the pivot shaft 214, and a second end portion on a side farther from the liquid supply member 45 than the pivot shaft 214. The pressing member 215 extends downward from the support 208. The pressing member 215 is disposed facing the second end portion of the pivot member 213 in the vertical direction.

As illustrated in FIG. 18A, when the liquid application member 451 is at the liquid application position, the pressing member 215 is separated from the pivot member 213. At this time, the first end portion end of the pivot member 213 is disposed in the liquid stored in the first liquid storage tank 43. Further, the pivot member 213 moves together with the first liquid storage tank 43 in response to the upward movement of the liquid application member 451 from the liquid application position. The pressing member 215 contacts the second end portion of the pivot member 213 before the liquid application member 451 reaches the separation position.

When the first liquid storage tank 43, the liquid supply member 45, and the liquid application member 451 are further raised with the pressing member 215 in contact with the second end portion of the pivot member 213, as illustrated in FIG. 18B, the pivot member 213 pivots in a direction (in other words, clockwise in FIG. 18B) in which the droplets of the liquid stored in the first liquid storage tank 43 are scattered toward the liquid supply member 45. Accordingly, the first end portion of the pivot member 213 is exposed from the liquid and the droplets of the liquid are supplied to the liquid supply member 45. As a result, the droplets of the liquid can be supplied to the area exposed from the liquid of the liquid supply member 45 in response to the movement of the liquid application member 451 from the liquid application position to the separation position.

It is desirable that the distance from the pivot shaft 214 to the first end portion of the pivot member 213 is longer than the distance from the pivot shaft 214 to the second end portion of the pivot member 213. Accordingly, the amount of movement of the first end portion of the pivot member 213 increases, and the amount of liquid to be supplied to the liquid supply member 45 increases.

According to the embodiment described above, the supply of liquid to the liquid supply member 45 can be facilitated with a simple configuration by operating the liquid supply facilitating mechanisms 200A to 200F in use of the driving force of the contact-separation motor 32*d*. As a result, liquid may be uniformly and accurately applied to a sheet P. Further, since the operation of the liquid applier 31 is not to be interpreted until liquid is supplied to the liquid application member 451, the above-described configuration of the liquid applier 31 can prevent the deterioration in productivity of the liquid applier 31.

Further, the liquid supply facilitating mechanisms 200A to 200C illustrated in FIGS. 13A to 15B can facilitate the supply of liquid to the liquid application member 451 via the liquid supply member 45 by increasing the liquid surface (liquid level) in the first liquid storage tank 43.

Further, the liquid supply facilitating mechanisms 200D to 200F illustrated in FIGS. 16A to 18C can facilitate the supply of liquid to the liquid application member 451 via the liquid supply member 45 by scattering the droplets of the liquid stored in the first liquid storage tank 43 to the liquid supply member 45.

Second Embodiment of Post-Processing Apparatus

Referring now to FIGS. 19 to 27, a description is given of a post-processing apparatus 3A according to a second embodiment of the present disclosure.

In the following description, components like those of the above-described embodiment are denoted by like reference numerals, and detailed descriptions thereof may be omitted.

The post-processing apparatus 3A according to the second embodiment is different from the post-processing apparatus 3 according to the first embodiment in which the liquid applier 131 and the crimper 32 are arranged side by side. In the post-processing apparatus 3A according to the second embodiment, a liquid applier 131 is disposed alone at an upstream position in a direction in which the sheet P is conveyed. Such a configuration allows a given number of sheets P to be stacked after the liquid is applied and conveyed to the crimper 32 of the edge binder 25 disposed at a downstream position in the direction in which the sheet P is conveyed. Accordingly, the productivity of the binding process performed by the crimper 32 is enhanced. Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to both the opposite conveyance direction and the thickness direction of the sheet P is defined as the "main scanning direction" or the "width direction of the sheet P." The position (liquid application position) to which the liquid is applied on the sheet P or the sheet bundle Pb by the liquid applier 131 corresponds to the binding position on the sheet bundle Pb to be crimped by the crimper 32. For this reason, in the following description, the liquid application position and the binding position are denoted by the same reference sign.

Figure 19:
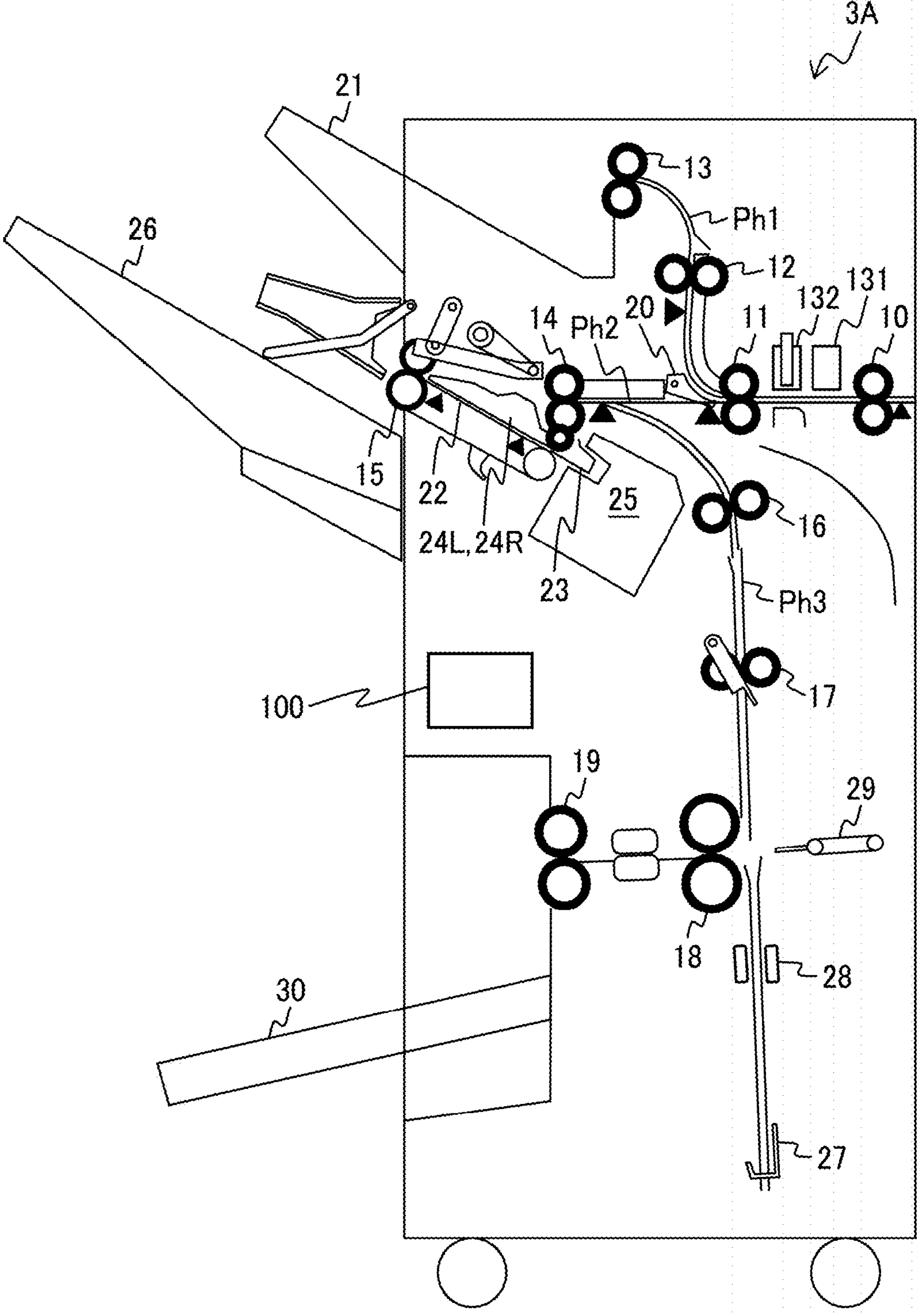
FIG. 19 is a diagram illustrating the internal configuration of a post-processing apparatus according to a second embodiment of the present disclosure.

FIG. 19 is a diagram illustrating an internal configuration of the post-processing apparatus 3A according to the second embodiment of the present disclosure.

Figure 20A:
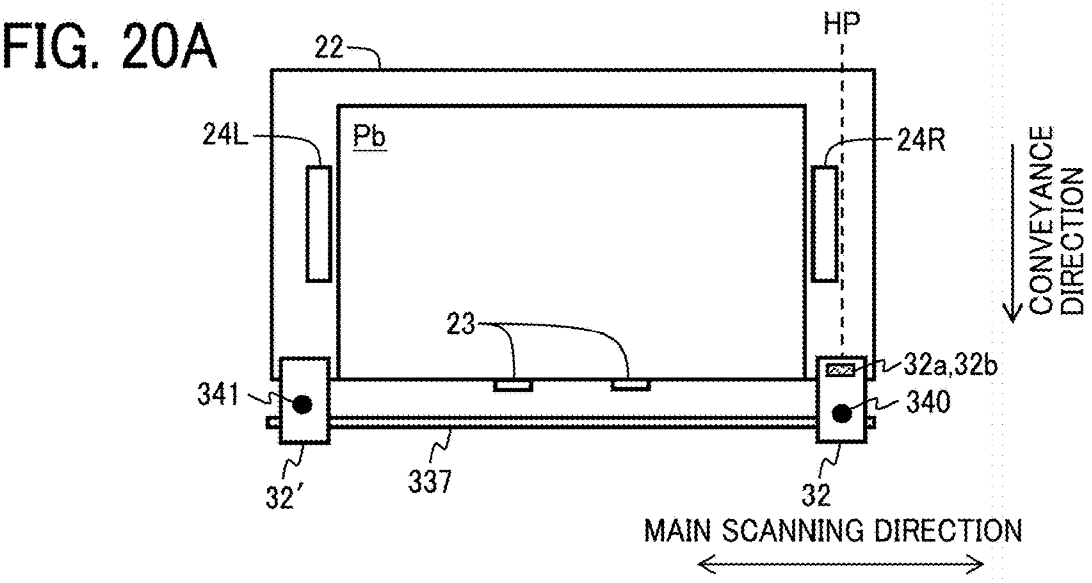
FIGS. 20A, 20B, and 20C are diagrams each illustrating an inner tray of the post-processing apparatus according to the second embodiment, viewed from the thickness direction of a sheet.
Figure 20B:
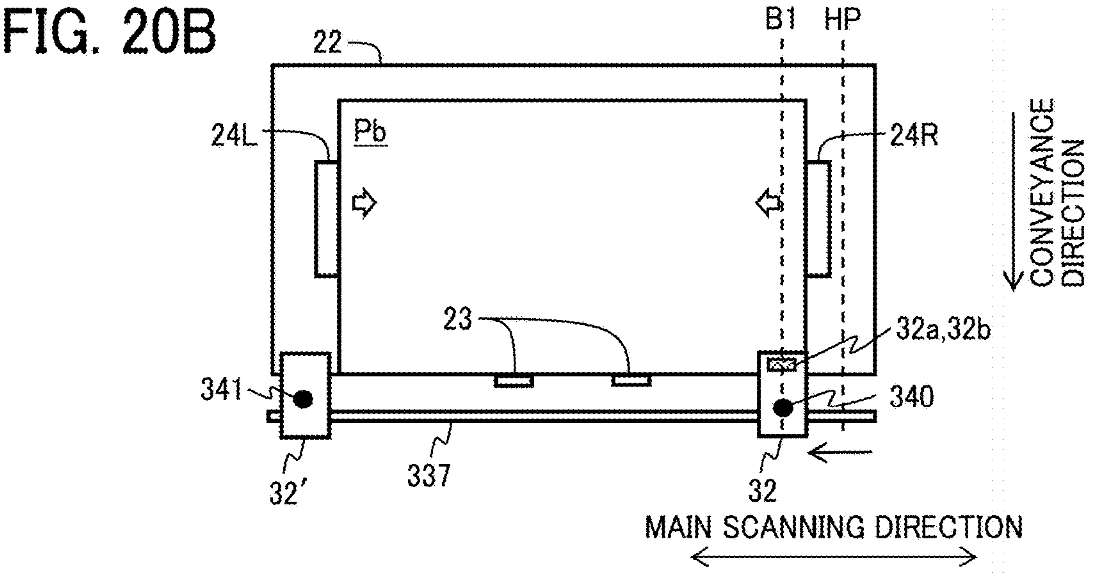
Figure 20C:
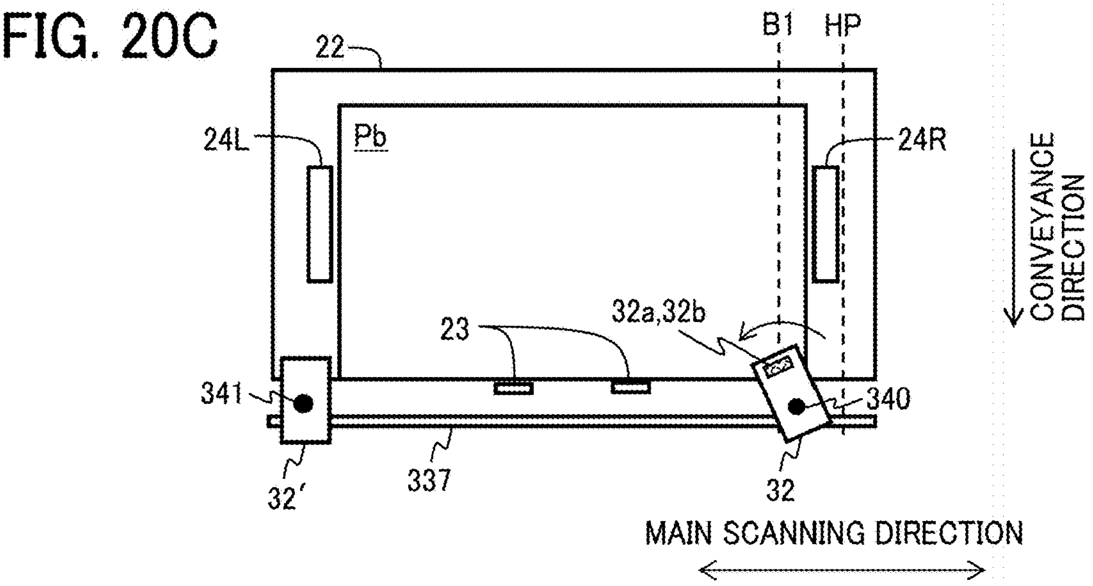

As illustrated in FIGS. 20A, 20B, and 20C, the edge binder 25 includes the crimper 32 and a stapler 32'. As illustrated in FIGS. 20A, 20B, and 20C, the crimper 32 and the stapler 32' are disposed downstream from the internal tray 22 in the conveyance direction. In addition, the crimper 32 and the stapler 32' are located to face a downstream end, in the conveyance direction, of the sheet bundle Pb placed on the internal tray 22 and move in the main scanning direction. Further, the crimper 32 and the stapler 32' are pivoted about an axis extending in the thickness direction of the sheet bundle Pb placed on the internal tray 22. In other words, the crimper 32 and the stapler 32' bind, at a desired angle, a desired position in the main scanning direction on the sheet bundle Pb placed on the internal tray 22 in, for example, corner oblique binding, parallel one-point binding, or parallel two-point binding.

The crimper 32 presses and deforms the sheet bundle Pb with serrate binding teeth 32*a* and 32*b* to bind the sheet bundle Pb. In the following description, such a binding way may be referred to as "crimp binding." In other words, the crimper 32 crimps and binds the sheet bundle Pb or performs the crimp binding on the sheet bundle Pb. On the other hand, the stapler 32' passes the staple through a binding position on the sheet bundle Pb placed on the internal tray 22 to staple the sheet bundle Pb.

FIGS. 20A, 20B, and 20C are diagrams illustrating the internal tray 22 in the thickness direction of the sheet bundle Pb.

Figure 21:
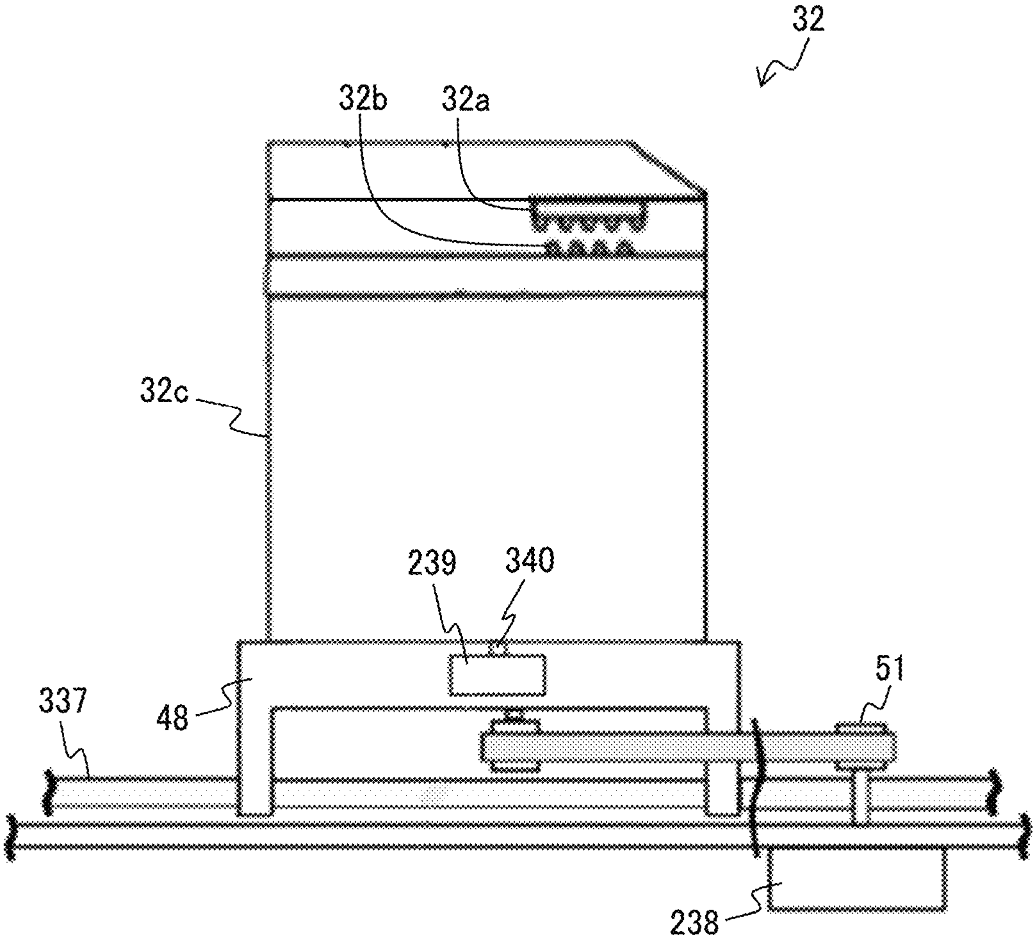
FIG. 21 is a schematic diagram illustrating a crimper of the post-processing apparatus according to the second embodiment of the present disclosure, viewed from the downstream side of the crimper in the conveyance direction of a sheet.

FIG. 21 is a schematic view of the crimper 32 as viewed from the downstream side in the conveying direction.

As illustrated in FIGS. 20A, 20B, and 20C, the crimper 32 and the stapler 32' are disposed downstream from the internal tray 22 in the conveyance direction.

The crimper 32 moves in the main scanning direction along the surface of the sheet bundle Pb placed on the internal tray 22. The crimper 32 is also pivoted about a pivot 340 extending in the thickness direction of the sheet bundle Pb placed on the internal tray 22. Similarly, the stapler 32' moves in the main scanning direction of the sheet bundle Pb and is pivoted about a pivot 341 extending in the thickness direction of the sheet bundle Pb. The other components of the stapler 32' are similar to, even if not the same as, the components of the staple binder 55 (see FIG. 6) of the post-processing apparatus 3 according to the first embodiment. For this reason, a detailed description the components of the stapler 32' is omitted.

More specifically, as illustrated in FIG. 21, a guide rail 337 extending in the main scanning direction is disposed downstream from the internal tray 22 in the conveyance direction. The crimper 32 is moved in the main scanning direction along the surface of the sheet bundle Pb placed on the internal tray 22, in other words, along the guide rail 337, by a driving force transmitted from a crimp binder movement motor 238 by a drive transmission assembly 240 including a pulley and a timing belt. The pivot 340 is fixed to a bottom face of the crimping frame 32*c* that holds the components of the crimper 32. The pivot 340 is rotatably held by the base 48 on which the crimping frame 32*c* is disposed. When a driving force is transmitted from a pivot motor 239 to the pivot 340, the crimper 32 is pivoted about the pivot 340 extending in the thickness direction of the sheet P placed on the internal tray 22. The guide rail 337, the crimp binder movement motor 238, the pivot motor 239, the pivot 340, and the drive transmission assembly 240 construct a driving assembly of the crimper 32.

The crimper 32 is movable between the standby position HP illustrated in FIG. 20A and a position where the crimper 32 faces the binding position B1 illustrated in FIGS. 20B and 20C. The standby position HP is away in the main scanning direction from the sheet bundle Pb placed on the internal tray 22. For example, in FIGS. 22A, 22B, and 22C, the standby position HP is away from the right side of the sheet bundle Pb in the main scanning direction. The binding position B1 is a position on the sheet bundle Pb placed on the internal tray 22. However, the specific position of the binding position B1 is not limited to the position illustrated in FIGS. 29B and 29C. The binding position B1 may be one or more positions along the main scanning direction at the downstream end, in the conveyance direction, of the sheet P.

The posture of the crimper 32 changes or is pivoted between a parallel binding posture illustrated in FIG. 20B and an oblique binding posture illustrated in FIG. 20C. The parallel binding posture is a posture of the crimper 32 in which the longitudinal direction of the upper binding teeth 32*a* and the lower binding teeth 32*b* (in other words, the rectangular crimping binding trace) is oriented in the main scanning direction. The oblique binding posture is a posture of the crimper 32 in which the length of the upper binding teeth 32*a* and lower binding teeth 32*b* (in other words, the rectangular crimp binding trace) is inclined with respect to the main scanning direction.

The pivot angle, which is an angle of the upper binding teeth 32*a* and the lower binding teeth 32*b* with respect to the main scanning direction), in the oblique binding posture is not limited to the angle illustrated in FIG. 20C. The pivot angle in the oblique binding posture may be any angle provided that the upper binding teeth 32*a* and the lower binding teeth 32*b* face the sheet bundle Pb placed on the internal tray 22.

Figure 27:
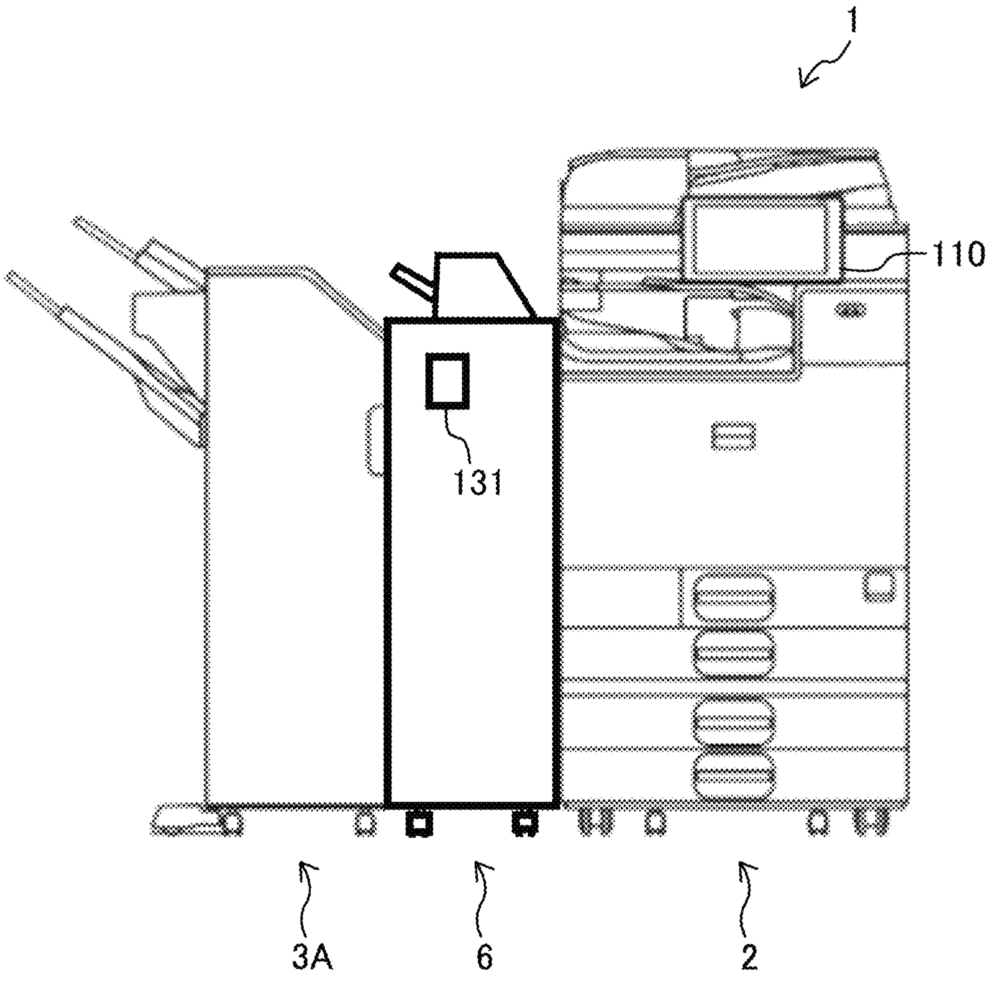
FIG. 27 is a diagram illustrating an overall configuration of an image forming system according to a modification of the embodiments.

The post-processing apparatus 3A includes the liquid applier 131 and a hole punch 132. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the embodiment illustrated in FIG. 19. For example, in a case where an inserter 6 is disposed between the image forming apparatus 2 and the post-processing apparatus 3A as illustrated in FIG. 27, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 22A:
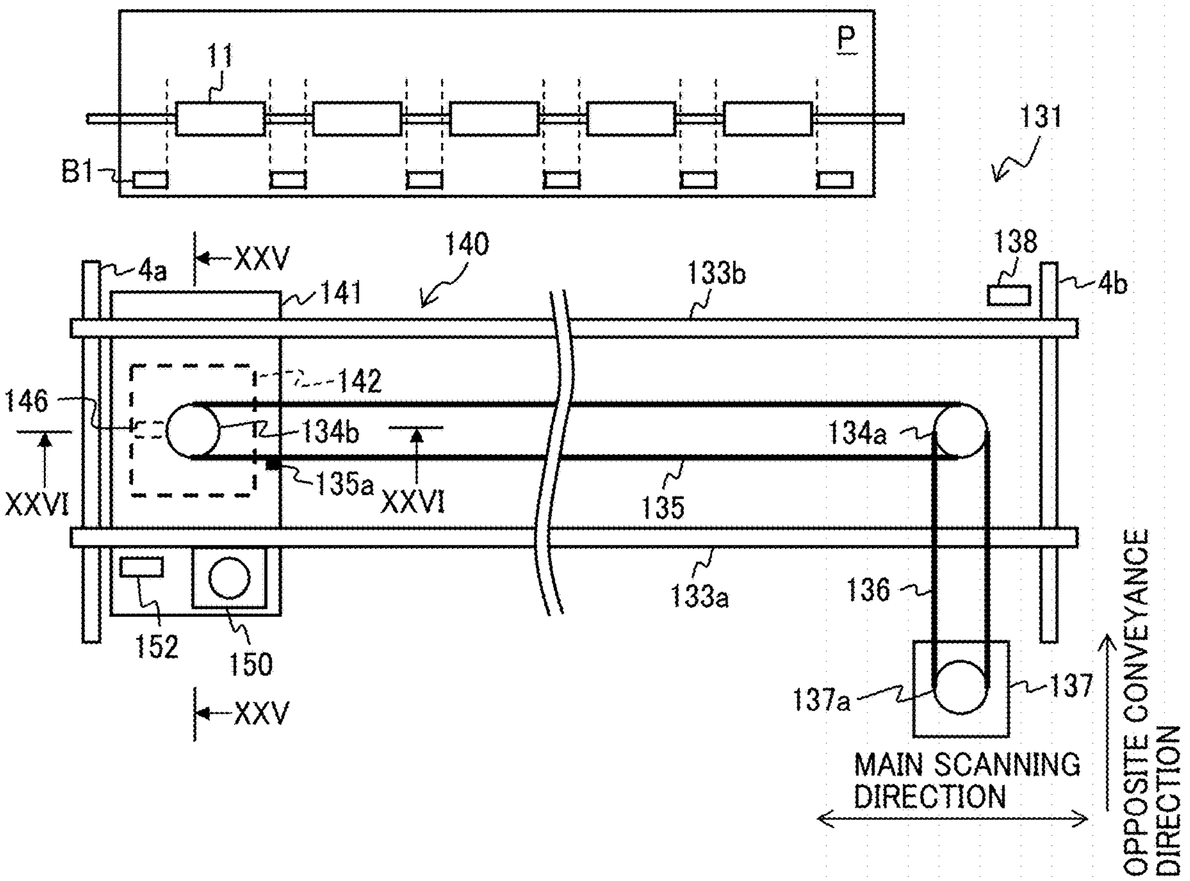
FIGS. 22A and 22B are schematic views of a liquid applier of the post-processing apparatus according to the second embodiment, viewed from the thickness direction of the sheet.

As illustrated in FIG. 22A, the conveyance roller pair 11 is located so as not to overlap, in the main scanning direction, the liquid application position B1 on the sheet P to which the liquid has been applied by a liquid application head 146 of the liquid applier 131. This arrangement is to prevent the amount of liquid at the liquid application position B1 from decreasing due to the multiple roller pairs pressing the liquid application position B1 when the conveyance roller pair 11 conveys the sheet P. As a result, when the sheet P reaches the crimper 32 disposed downstream from the liquid applier 131 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed.

In addition, the multiple roller pairs of the conveyance roller pair 11 that is located so as not to overlap the liquid application position B1 on the sheet P in the main scanning direction prevents the conveying performance of the sheet P from being worse due to the adhesion of liquid to the multiple roller pairs and further prevents a conveyance jam caused by the worsened conveying performance of the sheet P.

Although only the conveyance roller pair 11 has been described above, the multiple roller pairs of the conveyance roller pairs 14 and 15 are preferably located so as not to overlap the liquid application position B1 on the sheet P in the main scanning direction, like the multiple roller pairs of the conveyance roller pair 11.

The liquid applier 131 applies liquid (for example, water) to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 22B:
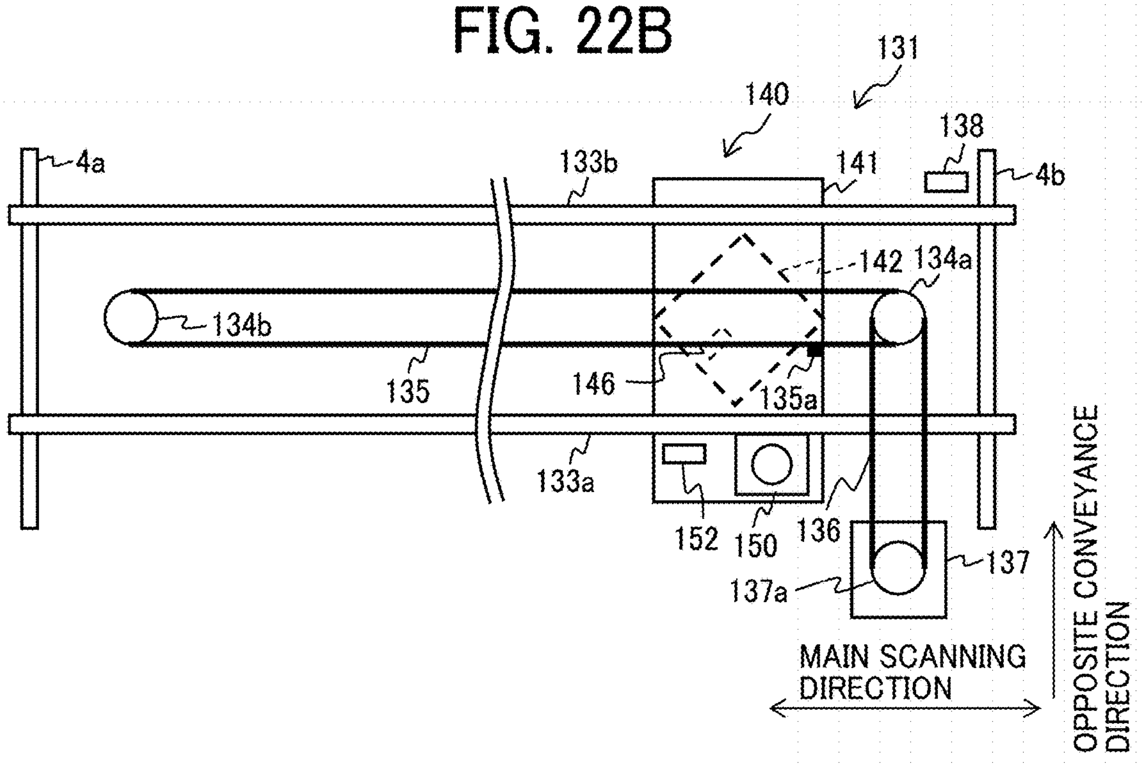

FIGS. 22A and 22B are schematic views of the liquid applier 131 in the thickness direction of the sheet P, according to the second embodiment of the present disclosure.

Figure 23A:
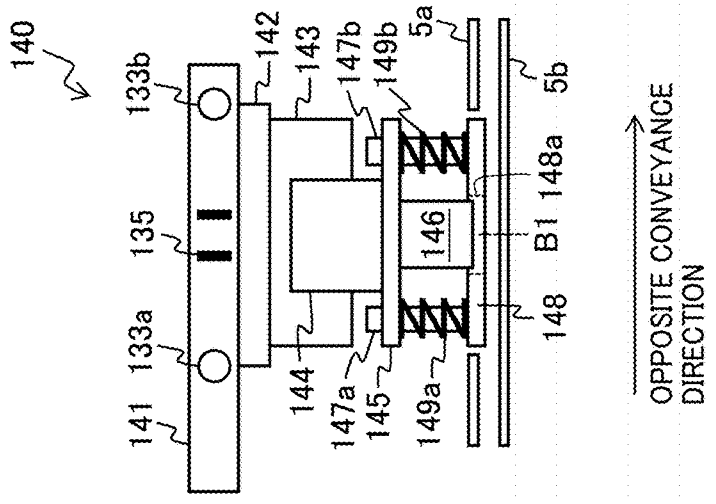
FIGS. 23A, 23B, and 23C are cross-sectional views of the liquid applier, taken along a line XXV-XXV of FIG. 22A.
Figure 23B:
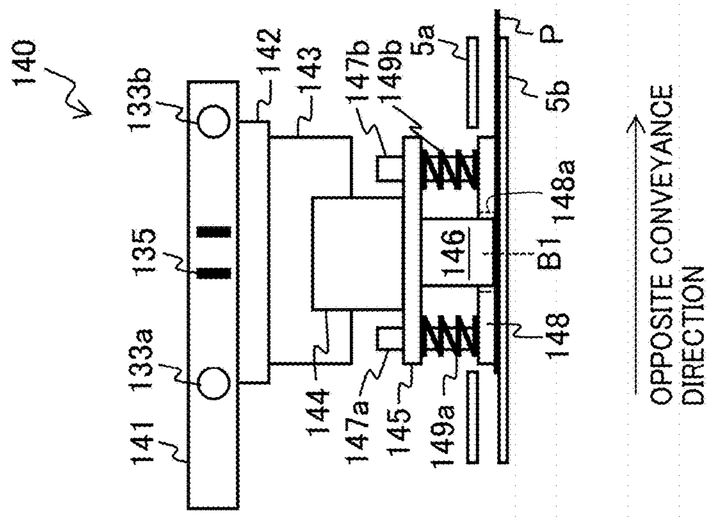
Figure 23C:
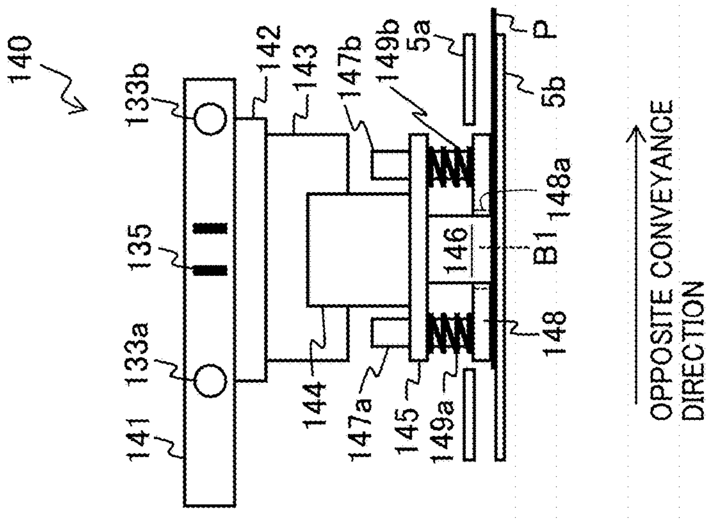

FIGS. 23A, 23B, and 23C are cross-sectional views of the liquid applier 131 taken along line XXV-XXV of FIG. 22A.

Figure 24A:
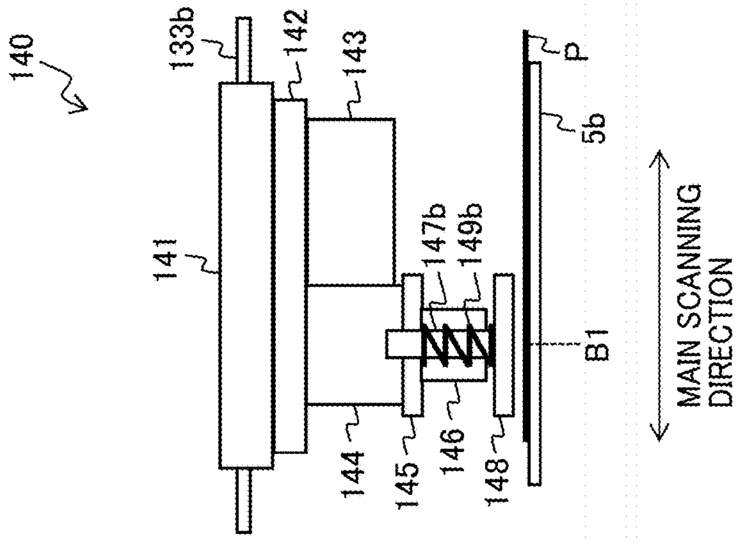
FIGS. 24A, 24B, and 24C are cross-sectional views of the liquid applier taken along a line XXVI-XXVI of FIG. 22A.
Figure 24B:
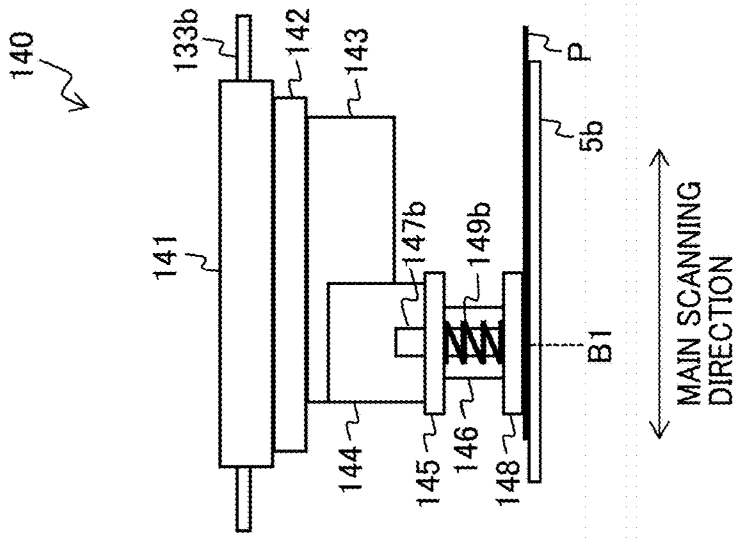
Figure 24C:
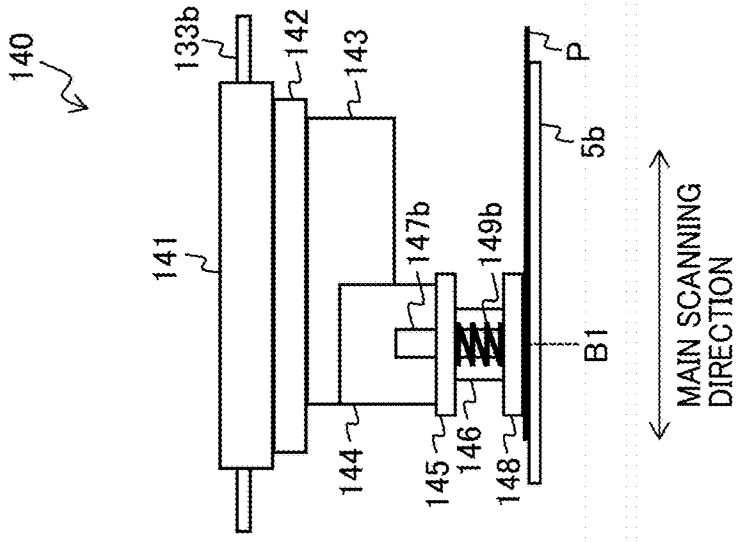

FIGS. 24A, 24B, and 24C are cross-sectional views of the liquid applier 31 taken along line XXVI-XXVI of FIG. 22A.

As illustrated in FIGS. 22A to 24C, the liquid applier 131 includes a pair of guide shafts 133*a* and 133*b*, a pair of pulleys 134*a* and 134*b*, endless annular belts 135 and 136, a liquid applier movement motor 137, a standby position sensor 138 (see FIG. 25), and a liquid application unit 140.

The guide shafts 133*a* and 133*b*, each extending in the main scanning direction, are spaced apart from each other in the opposite conveyance direction. The pair of guide shafts 133*a* and 133*b* are supported by a pair of side plates 4*a* and 4*b* of the post-processing apparatus 3A. The pair of guide shafts 133*a* and 133*b* support the liquid application unit 140 such that the liquid application unit 140 can move in the main scanning direction.

The pair of pulleys 134*a* and 134*b* is disposed between the pair of guide shafts 133*a* and 133*b* in the opposite conveyance direction. The pulleys 134*a* and 134*b* are disposed away from each other in the main scanning direction. The pair of pulleys 134*a* and 134*b* are supported by a frame of the post-processing apparatus 3A so as to be rotatable about the rotation axis extending in the thickness direction of the sheet P.

The endless annular belt 135 is looped around the pair of pulleys 134*a* and 134*b*. The endless annular belt 135 is coupled to the liquid application unit 140 by a connection 135*a*. The endless annular belt 136 is looped around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to switching of the rotation direction of the liquid applier movement motor 137.

The standby position sensor 138 detects that the liquid application unit 140 has reached a standby position in the main scanning direction. The standby position sensor 138 then outputs a standby position signal indicating the detection result to the controller 100, which will be described below with reference to FIG. 25. The standby position sensor 138 is, for example, an optical sensor including a light emitter and a light receiver. The liquid application unit 140 at the standby position blocks an optical path between the light emitter and the light receiver. The standby position sensor 138 outputs the standby position signal in response to the light output from the light emitter not being received by the light receiver. The specific configuration of the standby position sensor 138 is not limited to the configuration described above.

As illustrated in FIGS. 23A to 23C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 is disposed to face the conveyance passage (a position at which the liquid application unit 140 is to face the sheet P conveyed along the conveyance passage) through the opening of the upper guide plate 5*a*.

Figure 25:
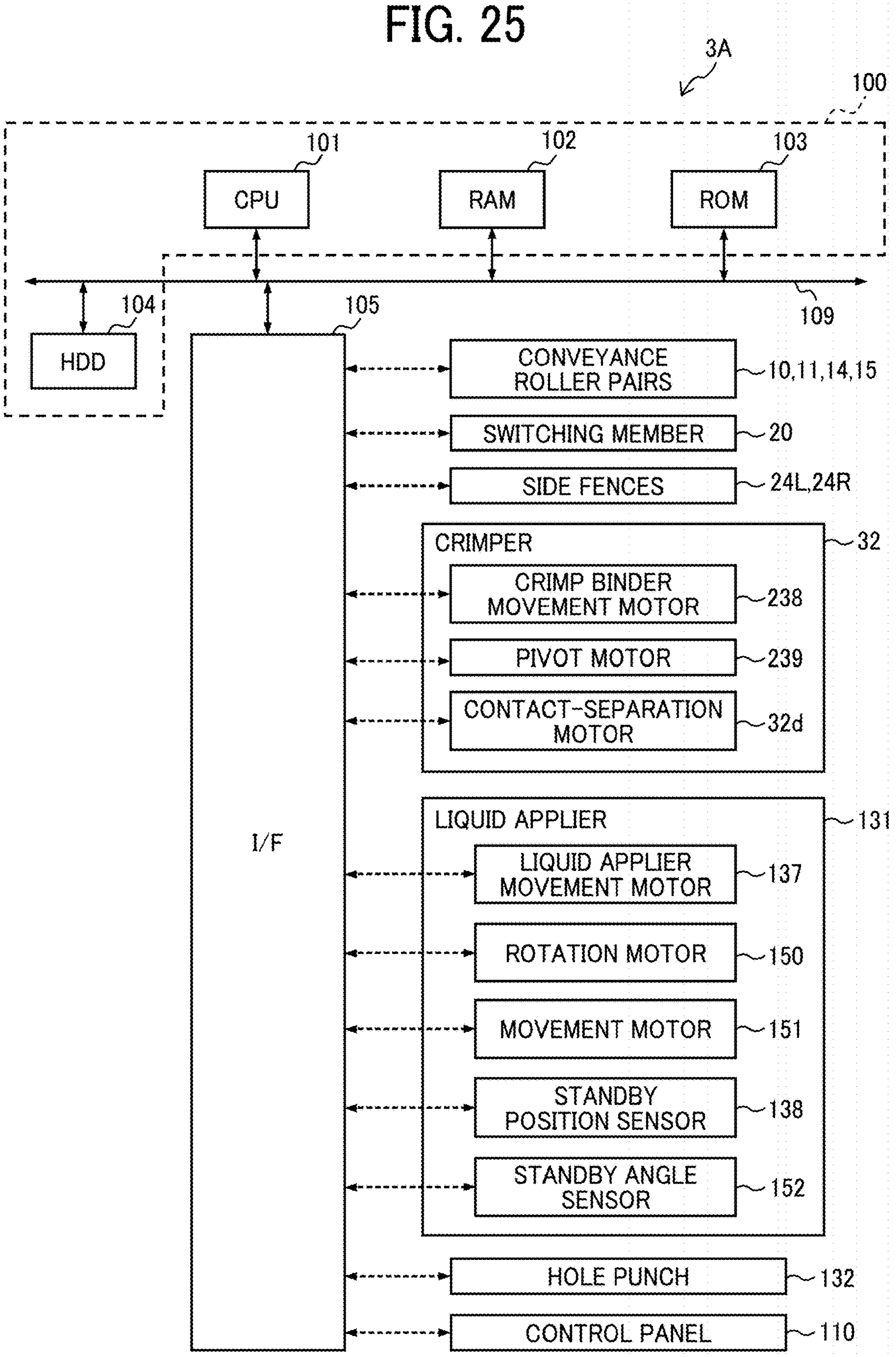
FIG. 25 is a control block diagram illustrating a hardware configuration of the post-processing apparatus according to the second embodiment to control the operation of the post-processing apparatus.

As illustrated in FIGS. 22A to 24C, the liquid application unit 140 includes a base 141, a rotary bracket 142, a liquid storage tank 143, a mover 144, a holder 145, the liquid application head 146, columns 147*a* and 147*b*, a pressure plate 148, coil springs 149*a* and 149*b*, a rotation motor 150, a movement motor 151 illustrated in FIG. 25, and a standby angle sensor 152, which is also illustrated in FIG. 25.

The base 141 is supported by the pair of guide shafts 133*a* and 133*b* so as to be slidable in the main scanning direction. The base 141 is coupled to the endless annular belt 135 by the connection 135*a*. The base 141 supports the components of the liquid application unit 140 such as the rotary bracket 142, the liquid storage tank 143, the mover 144, the holder 145, the liquid application head 146, the columns 147*a* and 147*b*, the pressure plate 148, the coil springs 149*a* and 149*b*, the rotation motor 150, the movement motor 151, and the standby angle sensor 152.

The rotary bracket 142 is supported by a lower face of the base 141 so as to be pivotable about an axis extending in the thickness direction of the sheet P. The rotary bracket 142 is rotated with respect to the base 141 by a driving force transmitted from the rotation motor 150. The rotary bracket 142 supports the liquid storage tank 143, the mover 144, the holder 145, the liquid application head 146, the columns 147*a* and 147*b*, the pressure plate 148, and the coil springs 149*a* and 149*b*.

The standby angle sensor 152, which is also illustrated in FIG. 25, detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. The standby angle sensor 152 outputs the standby angle signal in response to the light output from the light emitter not being received by the light receiver. The specific configuration of the standby angle sensor 152 is not limited to the configuration described above.

FIG. 22A illustrates the rotary bracket 142 in a position for the parallel binding that is performed by the crimper 32 disposed downstream from the liquid applier 131 in a direction in which the sheet P is conveyed.

FIG. 22B illustrates the rotary bracket 142 in a position for the oblique binding (i.e., corner binding) that is performed by the crimper 32 disposed downstream from the liquid applier 131 in the direction in which the sheet P is conveyed.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (e.g., sponge or fiber).

The columns 147*a* and 147*b* project downward from the holder 145 around the liquid application head 146. The columns 147*a* and 147*b* can move relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 downward with respect to the holder 145.

As illustrated in FIGS. 23A and 24A, before the sheet P is conveyed to the position where the sheet P faces the opening of the upper guide plate 5*a*, the pressure plate 148 is positioned at or above the opening. When the sheet P that is conveyed by the conveyance roller pairs 10 and 11 stops at a position where the liquid application position B1 on the sheet P faces the opening, the movement motor 151 is rotated in a first direction. As a result, the mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the binding position to be crimped and bound by the edge binder 25.

As the movement motor 151 keeps rotating in the first direction after the pressure plate 148 contacts the sheet P, the coil springs 149*a* and 149*b* are compressed to further move down the mover 144, the holder 145, the liquid application head 146, and the columns 147*a* and 147*b*.

As a result, as illustrated in FIGS. 23B and 24B, the lower face of the liquid application head 146 contacts the sheet P through the through hole 148*a*. As a result, the liquid contained in the liquid application head 146 is applied to the sheet P.

Further rotation of the movement motor 151 in the first direction further strongly presses the liquid application head 146 against the sheet P, as illustrated in FIGS. 23C and 24C. Accordingly, the amount of liquid that is applied to the sheet P increases. In other words, the liquid applier 131 changes the pressing force of the liquid application head 146 against the sheet P to adjust the amount of liquid that is applied to the sheet P.

On the other hand, the rotation of the movement motor 151 in a second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 23A and 24A, the liquid application head 146 and the pressure plate 148 are separated from the sheet P. In other words, the liquid applier 131 includes the liquid application head 146 that can be separated from the sheet P.

FIG. 25 is a block diagram illustrating a control block hardware configuration of the post-processing apparatus 3A to control the operation of the post-processing apparatus 3A according to the second embodiment of the present disclosure.

As illustrated in FIG. 25, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A.

The RAM 102 is a volatile storage medium that allows data to be read and written at high speed. The CPU 101 uses the RAM 102 as a working area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching member 20, the side fences 24L and 24R, the crimp binder movement motor 238, the pivot motor 239, the contact-separation motor 32*d*, the liquid applier movement motor 137, the rotation motor 150, the movement motor 151, the standby position sensor 138, the standby angle sensor 152, the hole punch 132, and the control panel 110, to the common bus 109. The controller 100 controls operations of the conveyance roller pairs 10, 11, 14, and 15, the switching member 20, the side fences 24L and 24R, the crimp binder movement motor 238, the pivot motor 239, the contact-separation motor 32*d*, the liquid applier movement motor 137, the rotation motor 150, the movement motor 151, and the hole punch 132, through the I/F 105. On the other hand, the controller 100 acquires, via the I/F 105, detection results from the standby position sensor 138 and the standby angle sensor 152. Although FIG. 25 illustrates the parts and components that execute the edge stitching process, the parts and components that execute the saddle stitching process are also similarly controlled by the controller 100.

The control panel 110 includes an operation device that receives instructions input by an operator and a display serving as a notifier that notifies the operator of information. The operation device includes, for example, hard keys and a touch screen overlaid on the display. The control panel 110 acquires information from the user through the operation unit and provides the information to the user through the display.

Figure 26:
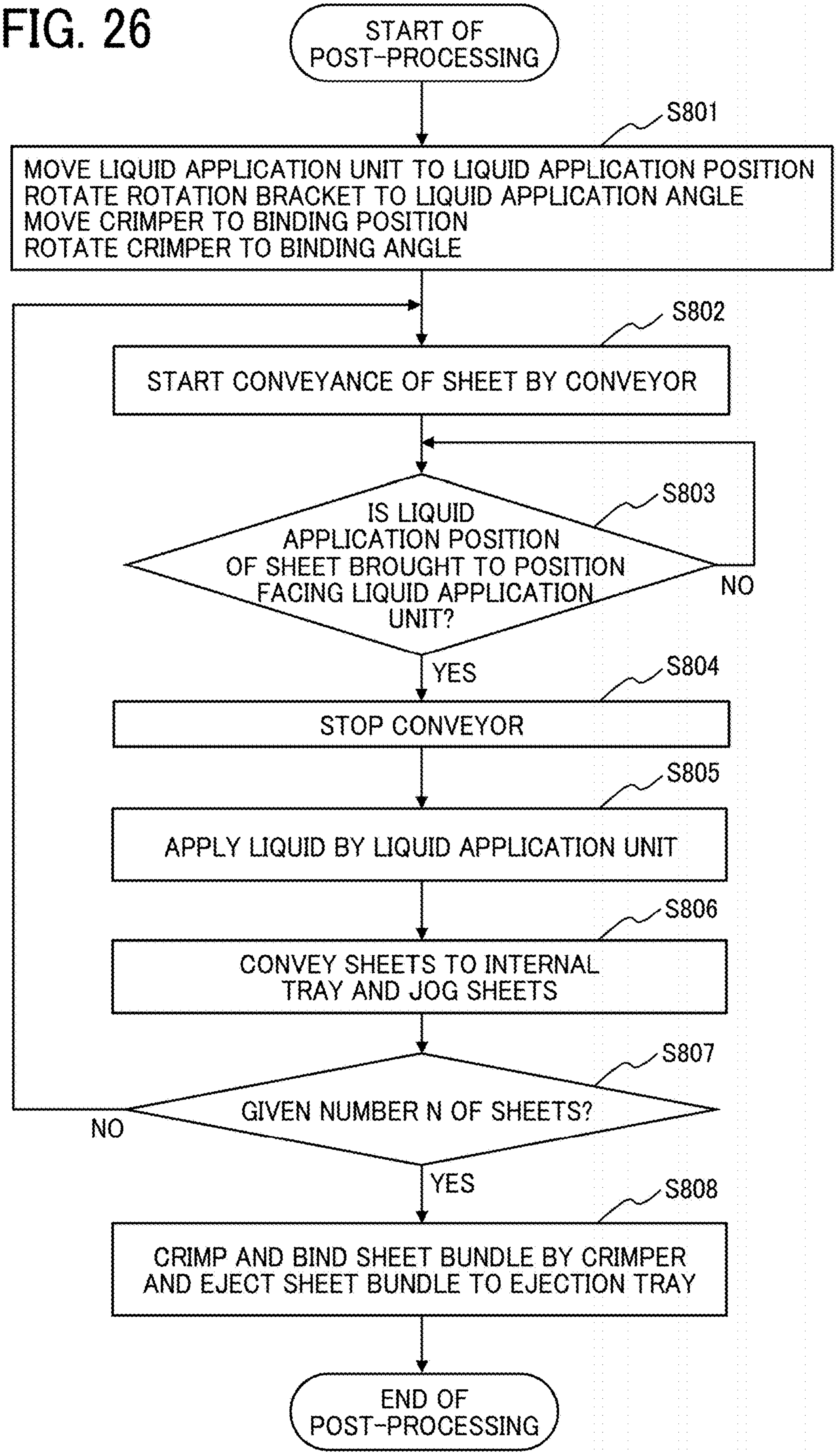
FIG. 26 is a flowchart of post-processing performed by the post-processing apparatus according to the second embodiment of the present disclosure.

FIG. 26 is a flowchart of the post-processing process performed by the post-processing apparatus 3A according to the second embodiment of the present disclosure.

FIG. 27 is a diagram illustrating an overall configuration of an image forming system according to a modification of the embodiments.

Specifically, FIG. 26 is a flowchart of a process to execute the one-point binding illustrated in FIGS. 20A to 20C.

For example, the controller 100 executes the post-processing process as illustrated in FIG. 26 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the binding position B1 (corresponding to the liquid application position B1), a binding angle (corresponding to a liquid application angle), and a process that is executed in parallel with the liquid application process (i.e., punching a hole in the present embodiment). In the following description, the number of sheets P of the sheet bundle Pb may be referred to as a "given number N." At the start of the post-processing, the liquid application unit 140 is at the standby position HP corresponding to the standby position HP illustrated in FIGS. 20A to 20C whereas the rotary bracket 142 is held at the standby angle.

First, in step S801, the controller 100 drives the liquid applier movement motor 137 to move the liquid application unit 140 in the main scanning direction such that liquid application head 146 moves from the standby position HP to a position where the liquid application head 146 can face the liquid application position B1 corresponding to the binding position B1 illustrated in FIGS. 20A, 20B, and 20C. In addition, in step S801, the controller 100 drives the rotation motor 150 to rotate the rotary bracket 142 such that the liquid application head 146 rotates from the standby angle to the liquid application angle. It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the rotation motor 150 that the liquid application head 146 has reached the liquid application angle.

Further, in step S801, the controller 100 drives the crimp binder movement motor 238 to move the crimper 32 from the standby position HP to the position where the crimper 32 can face the binding position B1 as illustrated in FIGS. 20A and 20B. Furthermore, in step S801, the controller 100 drives the pivot motor 239 to rotate the crimper 32 from the standby angle to the binding angle, which may be referred to as a crimp binding angle in the following description. It is ascertained based on a pulse signal output from a rotary encoder of the crimp binder movement motor 238 that the crimper 32 has reached the position where the crimper 32 can face the binding position B1. Similarly, it is ascertained based on a pulse signal output from a rotary encoder of the pivot motor 239 that the crimper 32 has reached the crimp binding angle.

Subsequently, in step S802, the controller 100 drives the conveyance roller pairs 10 and 11 to start conveying the sheet P on which an image is formed by the image forming apparatus 2. In step S803, the controller 100 determines whether the liquid application position B1 on the sheet P has faced the liquid application unit 140 (more specifically, the liquid application head 146). When the liquid application position B1 on the sheet P has not faced the liquid application head 146 (NO in step S803), the controller 100 repeats the determination in step S803. In other words, the controller 100 continues driving the conveyance roller pairs 10 and 11 until the liquid application position B1 on the sheet P faces the liquid application head 146.

In contrast, when the liquid application position B1 on the sheet P has faced the liquid application head 146 (YES in step S803), in step S804, the controller 100 stops the conveyance roller pairs 10 and 11.

It is ascertained, based on a pulse signal output from a rotary encoder of a motor that drives the conveyance roller pairs 10 and 11, that the liquid application position B1 on the sheet P has faced the liquid application head 146.

In step S805, the controller 100 causes the liquid applier 131 to execute the process to apply liquid to the liquid application position B1 on the sheet P. More specifically, the controller 100 rotates the movement motor 151 in the first direction to bring the liquid application head 146 into contact with the liquid application position B1 on the sheet P. In addition, the controller 100 changes the pressing force of the liquid application head 146 (in other words, the amount of rotation of the movement motor 151) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

Subsequently, in step S806, the controller 100 drives the conveyance roller pairs 10, 11, 14, and 15 to place a sheet P on the internal tray 22. The controller 100 moves the side fences 24L and 24R to align the position of the sheet bundle Pb placed on the internal tray 22 in the main scanning direction. In short, the controller 100 performs so-called jogging.

Subsequently, in step S807, the controller 100 determines whether the number of sheets P placed on the internal tray 22 has reached the given number N of sheets indicated by the post-processing command. When the controller 100 determines that the number of sheets P placed on the internal tray 22 has not reached the given number N of sheets P (NO in step S807), the controller 100 executes the operations of steps S802 to S806 again.

In contrast, when the controller 100 determines that the number of sheets P placed on the internal tray 22 has reached the given number N of sheets P (YES in step S807), in step S808, the controller 100 causes the crimper 32 to crimp and bind the binding position B1 (corresponding to the liquid application position B1) on the sheet bundle Pb to which the liquid has been applied by the liquid applier 131. In addition, in step S808, the controller 100 rotates the conveyance roller pair 15 to eject the crimp-bound sheet bundle Pb to the ejection tray 26.

Then, the controller 100 drives the liquid applier movement motor 137 to move the liquid applier 131 to the standby position HP and drives the crimp binder movement motor 238 to move the crimper 32 to the standby position HP.

As described above, the control method by the controller 100 described above is implemented by cooperation between hardware resources of a computer and a program as computer software. In other words, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Embodiments of the present disclosure are not limited to the above-described embodiments, and numerous additional modifications and variations are possible in light of the teachings within the technical scope of the appended claims. It is therefore to be understood that the above-described embodiments of the present disclosure may be practiced otherwise by those skilled in the art than as specifically described herein. Such modifications are included in the technical scope described in the scope of claims.

ASPECTS OF THE PRESENT DISCLOSURE

Aspects of the present disclosure are, for example, as follows.

Aspect 1

In Aspect 1, a medium processing apparatus includes a liquid applier and a crimper. The liquid applier applies liquid on a medium. The crimper crimps and binds multiple media including the medium with the liquid applied on the multiple media by the liquid applier. The liquid applier includes a liquid storage, a liquid supply member, a liquid application member, a mover, and a liquid supply facilitator. The liquid storage stores liquid. The liquid supply member has a first end and a second end, with the first end immersed in the liquid stored in the liquid storage. The liquid application member is attached to the second end of the liquid supply member at a position opposite to the medium. The mover moves the liquid storage, the liquid supply member, and the liquid application member, between a liquid application position at which the liquid application member contacts the medium to apply liquid to the medium and a separation position at which the liquid application member separates the medium. The liquid supply facilitator increases a contact area in which the liquid stored in the liquid storage and the liquid supply member contact in response to a movement of the liquid application member from the liquid application position to the separation position.

Aspect 2

In Aspect 2, in the medium processing apparatus according to Aspect 1, the liquid storage is divided into a first chamber in which the first end of the liquid supply member is immersed, a second chamber communicating with the first chamber at a lower end of the liquid storage. The liquid supply facilitator includes a lowering member to lower a liquid surface of the second chamber in response to the movement of the liquid application member from the application position to the separation position.

Aspect 3

In Aspect 3, in the medium processing apparatus according to Aspect 2, the liquid supply facilitator includes a biasing member to bias the lowering member in an upward direction opposite to a downward direction in which the lowering member lowers the liquid surface of the second chamber. The lowering member moves in the downward direction to lower the liquid surface of the second chamber against a biasing force of the biasing member in response to a movement of the liquid application member from the liquid application position to the separation position, and in the upward direction by the biasing force of the biasing member in response to a movement of the liquid application member from the separation position to the liquid application position.

Aspect 4

In Aspect 4, in the medium processing apparatus according to Aspect 2 or 3, a first horizontal cross-sectional area of the second chamber is greater than a second horizontal cross-sectional area of the first chamber.

Aspect 5

In Aspect 5, in the medium processing apparatus according to Aspect 1, the liquid supply facilitator includes a first bag portion, a second bag portion, a communicator, and a compressor. The first bag portion is expandable and disposed above a liquid surface of the liquid storage. The second bag portion is expandable and disposed in the liquid stored in the liquid storage. The communicator communicates between the first bag portion and the second bag portion. The compressor compresses in response to a movement of the liquid application member from the liquid application position to the separation position, and decompresses the first bag portion in response to a movement of the liquid application member from the separation position to the liquid application position.

Aspect 6

In Aspect 6, in the medium processing apparatus according to Aspect 1, the liquid supply facilitator includes a pinion having a portion immersed in the liquid stored in the liquid storage, a rack to rotate the pinion in a direction in which an airborne droplet of the liquid stored in the liquid storage is blown toward the liquid supply member in response to a movement of the liquid application member from the liquid application position to the separation position.

Aspect 7

In Aspect 7, in the medium processing apparatus according to Aspect 1, the liquid supply facilitator includes an impeller, a pinion, and a rack. The impeller has a portion immersed in the liquid stored in the liquid storage. The pinion is disposed outside the liquid storage to rotate with the impeller as a single unit. The rack rotates the pinion in a direction in which an airborne droplet of the liquid stored in the liquid storage is blown toward the liquid supply member, together with a movement of the liquid application member from the liquid application position to the separation position.

Aspect 8

In Aspect 8, in the medium processing apparatus according to Aspect 1, the liquid supply facilitator includes a pivot member pivotably supported inside the liquid storage, and a pressing member to press up the pivot member at an end farther from the liquid supply member, and blow an airborne droplet of the liquid stored in the liquid storage toward the liquid supply member in response to a movement of the liquid application member from the liquid application position to the separation position.

Aspect 9

In Aspect 9, an image forming system includes an image forming apparatus to form an image on each medium of multiple media, and the medium processing apparatus according to any one of Aspects 1 to 8 to crimp and bind the multiple media having the image on each medium.

Aspect 10

In Aspect 10, a medium processing apparatus includes a liquid applier, a crimper, and a mover. The liquid applier applies liquid on a medium. The crimper crimps and binds multiple media including the medium with the liquid applied by the liquid applier. The mover moves the liquid applier. The liquid applier includes a liquid storage, a liquid supply member, a liquid application member, and a liquid supply facilitator. The liquid storage stores liquid. The liquid supply member has a first end immersed in the liquid stored in the liquid storage, and a second end opposite to the first end. The liquid application member is attached to the second end of the liquid supply member. The liquid application member contacts the medium to apply the liquid onto the medium. The liquid supply facilitator increases a contact area between the liquid supply member and the liquid stored in the liquid storage, in response to a movement of the liquid applier from an application position to a separation position. The mover moves the liquid applier between the application position at which the liquid application member contacts the medium to apply the liquid to the medium and the separation position at which the liquid application member is separated from the medium.

Aspect 11

In Aspect 11, in the medium processing apparatus according to Aspect 10, the liquid storage includes a first chamber in which the first end of the liquid supply member is immersed in the liquid, and a second chamber divided from the first chamber and communicating with the first chamber at a lower end of the liquid storage. The liquid supply facilitator includes a lowering member to lower a liquid surface of the liquid in the second chamber in a downward direction in response to the movement of the liquid application member from the application position to the separation position.

Aspect 12

In Aspect 12, in the medium processing apparatus according to Aspect 11, the liquid supply facilitator includes a biasing member to bias the lowering member in an upward direction opposite to the downward direction. The lowering member moves: in the downward direction to lower the liquid surface of the second chamber against a biasing force of the biasing member in response to the movement of the liquid applier from the application position to the separation position; and in the upward direction by the biasing force of the biasing member in response to a movement of the liquid applier from the separation position to the application position.

Aspect 13

In Aspect 13, in the medium processing apparatus according to Aspect 11 or 12, the first chamber has a first horizontal cross-sectional area, and the second chamber has a second horizontal cross-sectional area greater than the first horizontal cross-sectional area of the first chamber.

Aspect 14

In Aspect 14, in the medium processing apparatus according to Aspect 10, the liquid supply facilitator includes a first bag portion, a second bag portion, a communicator, and a compressor. The first bag portion is expandable and disposed above a liquid surface of the liquid storage. The second bag portion is expandable and disposed in the liquid stored in the liquid storage. The communicator communicates between the first bag portion and the second bag portion. The compressor compresses the first bag portion in response to a movement of the liquid application member from the application position to the separation position, and decompresses the first bag portion in response to a movement of the liquid application member from the separation position to the application position.

Aspect 15

In Aspect 15, in the medium processing apparatus according to Aspect 10, the liquid supply facilitator includes a pinion and a rack. The pinion has a portion immersed in the liquid in the liquid storage. The rack rotates the pinion in a direction that blows droplets of the liquid in the liquid storage toward the liquid supply member in response to the movement of the liquid application member from the application position to the separation position.

Aspect 16

In Aspect 16, in the medium processing apparatus according to Aspect 10, the liquid supply facilitator includes an impeller, a pinion, and a rack. The impeller has a portion immersed in the liquid stored in the liquid storage. The pinion is disposed outside the liquid storage to rotate with the impeller as a single unit. The rack rotates the pinion and the impeller in a direction that blows droplets of the liquid in the liquid storage toward the liquid supply member in response to the movement of the liquid application member from the application position to the separation position.

Aspect 17

In Aspect 17, in the medium processing apparatus according to Aspect 10, the liquid supply facilitator includes a pivot member and a pressing member. The pivot member is pivotably supported inside the liquid storage. The pressing member presses one end of the pivot member farther from the liquid supply member, to blow droplets of the liquid in the liquid storage toward the liquid supply member, in response to the movement of the liquid applier from the application position to the separation position.

Aspect 18

In Aspect 18, an image forming system includes an image forming apparatus to form an image on each medium of multiple media, and the medium processing apparatus according to any one of Aspects 10 to 17 to crimp and bind the multiple media having the image on each medium.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium processing apparatus comprising:
a liquid applier to apply liquid onto a medium;
a crimper to crimp and bind multiple media including the medium with the liquid applied by the liquid applier; and
a mover to move the liquid applier,
wherein the liquid applier includes:
a liquid storage to store liquid;
a liquid supply member having:
a first end immersed in the liquid stored in the liquid storage; and
a second end opposite to the first end;
a liquid application member attached to the second end of the liquid supply member, the liquid application member to contact the medium to apply the liquid onto the medium;
a liquid supply facilitator to increase a contact area between the liquid supply member and the liquid stored in the liquid storage, in response to a movement of the liquid applier from an application position to a separation position, and
the mover moves the liquid applier between:
the application position at which the liquid application member contacts the medium to apply the liquid to the medium; and
the separation position at which the liquid application member is separated from the medium.

2. The medium processing apparatus according to claim 1, wherein the liquid storage includes:
a first chamber in which the first end of the liquid supply member is immersed in the liquid; and
a second chamber divided from the first chamber and communicating with the first chamber at a lower end of the liquid storage, and
the liquid supply facilitator includes a lowering member to lower a liquid surface of the liquid in the second chamber in a downward direction in response to the movement of the liquid application member from the application position to the separation position.

3. The medium processing apparatus according to claim 2, wherein the liquid supply facilitator includes a biasing member to bias the lowering member in an upward direction opposite to the downward direction, and
the lowering member moves:
in the downward direction to lower the liquid surface of the second chamber against a biasing force of the biasing member in response to the movement of the liquid applier from the application position to the separation position, and
in the upward direction by the biasing force of the biasing member in response to a movement of the liquid applier from the separation position to the application position.

4. The medium processing apparatus according to claim 2, wherein the first chamber has a first horizontal cross-sectional area, and
the second chamber has a second horizontal cross-sectional area greater than the first horizontal cross-sectional area of the first chamber.

5. The medium processing apparatus according to claim 1, wherein the liquid supply facilitator includes:
a first bag portion that is expandable and disposed above a liquid surface of the liquid storage;
a second bag portion that is expandable and disposed in the liquid stored in the liquid storage;
a communicator communicating between the first bag portion and the second bag portion; and
a compressor to:
compress the first bag portion in response to a movement of the liquid application member from the application position to the separation position; and
decompress the first bag portion in response to a movement of the liquid application member from the separation position to the application position.

6. The medium processing apparatus according to claim 1, wherein the liquid supply facilitator includes:
a pinion having a portion immersed in the liquid in the liquid storage; and
a rack to rotate the pinion in a direction that blows droplets of the liquid in the liquid storage toward the liquid supply member in response to the movement of the liquid application member from the application position to the separation position.

7. The medium processing apparatus according to claim 1, wherein the liquid supply facilitator includes:
an impeller having a portion immersed in the liquid stored in the liquid storage;
a pinion disposed outside the liquid storage to rotate with the impeller as a single unit; and
a rack to rotate the pinion and the impeller in a direction that blows droplets of the liquid in the liquid storage toward the liquid supply member in response to the movement of the liquid application member from the application position to the separation position.

8. The medium processing apparatus according to claim 1, wherein the liquid supply facilitator includes:
a pivot member pivotably supported inside the liquid storage; and
a pressing member to press one end of the pivot member farther from the liquid supply member, to blow droplets of the liquid in the liquid storage toward the liquid supply member, in response to the movement of the liquid applier from the application position to the separation position.

9. An image forming system comprising:
an image forming apparatus to form an image on each medium of multiple media; and
the medium processing apparatus according to claim 1 to crimp and bind the multiple media having the image on each medium.

* * * * *